(12) United States Patent
Gass et al.

(10) Patent No.: US 8,151,675 B2
(45) Date of Patent: Apr. 10, 2012

(54) LOGIC CONTROL FOR FAST-ACTING SAFETY SYSTEM

(75) Inventors: Stephen F. Gass, Wilsonville, OR (US);
J. David Fulmer, Tualatin, OR (US);
Joel F. Jensen, Redwood City, CA (US);
Benjamin B. Schramm, Los Gatos, CA (US); Robert L. Chamberlain, Raleigh, NC (US)

(73) Assignee: SD3, LLC, Tualatin, OR (US)

( * ) Notice: Subject to any disclaimer, the term of this patent is extended or adjusted under 35 U.S.C. 154(b) by 0 days.

(21) Appl. No.: 13/065,882

(22) Filed: Mar. 31, 2011

(65) Prior Publication Data

US 2011/0239837 A1 Oct. 6, 2011

Related U.S. Application Data

(62) Division of application No. 12/587,695, filed on Oct. 9, 2009, now Pat. No. 7,921,754, which is a division of application No. 09/929,237, filed on Aug. 13, 2001, now Pat. No. 7,600,455.

(60) Provisional application No. 60/225,056, filed on Aug. 14, 2000, provisional application No. 60/255,057, filed on Aug. 14, 2000, provisional application No. 60/225,058, filed on Aug. 14, 2000, provisional application No. 60/225,059, filed on Aug. 14, 2000, provisional application No. 60/225,089, filed on Aug. 14, 2000, provisional application No. 60/225,094, filed on Aug. 14, 2000, provisional application No. 60/225,169, filed on Aug. 14, 2000, provisional application No. 60/225,170, filed on Aug. 14, 2000, provisional application No. 60/225,200, filed on Aug. 14, 2000, provisional application No. 60/225,201, filed on Aug. 14, 2000, provisional application No. 60/225,206, filed on Aug. 14, 2000, provisional application No. 60/225,210, filed on Aug. 14, 2000, provisional application No. 60/225,211, filed on Aug. 14, 2000, provisional application No. 60/225,212, filed on Aug. 14, 2000.

(51) Int. Cl.
*B26D 5/00* (2006.01)
*B27B 13/14* (2006.01)

(52) U.S. Cl. ......... 83/58; 83/62.1; 83/DIG. 1; 83/477.1; 83/477.2; 83/490; 83/788

(58) Field of Classification Search ............. 83/58, 62.1, 83/DIG. 1, 477.1, 477.2, 490, 788, 471.3, 83/589, 581, 397.1, 630, 292; 197/130; 340/411; 307/117

See application file for complete search history.

(56) References Cited

U.S. PATENT DOCUMENTS

| | | | |
|---|---|---|---|
| 146,886 A | 1/1874 | Doane et al. |
| 162,814 A | 5/1875 | Graves et al. |
| 261,090 A | 7/1882 | Grill |
| 264,412 A | 9/1882 | Kuhlmann |

(Continued)

FOREIGN PATENT DOCUMENTS

CA 2140991 1/1995

(Continued)

OTHER PUBLICATIONS

Skil Model 3400—Type 1 10" Table Saw Parts List and Technical Bulletin, S-B Power Tool Company, Jun. 1993.

(Continued)

*Primary Examiner* — Ghassem Alie

(57) ABSTRACT

Woodworking machines including cutting tools and motors adapted to drive the cutting tools are disclosed. The machines also include a detection system adapted to detect a dangerous condition between the cutting tool and a person, and a reaction system adapted to perform a specified action upon detection of the dangerous condition. The machines further include a control system adapted to test the operability of at least a portion of the detection system and/or the reaction system. The control system is adapted to disable the motor if the tested portion is inoperable.

2 Claims, 11 Drawing Sheets

U.S. PATENT DOCUMENTS

| | | | |
|---|---|---|---|
| 299,480 A | 5/1884 | Kuhlman et al. | |
| 302,041 A | 7/1884 | Sill | |
| 307,112 A | 10/1884 | Groff | |
| 509,253 A | 11/1893 | Shields | |
| 545,504 A | 9/1895 | Hoover | |
| 869,513 A | 10/1907 | Pfeil | |
| 941,726 A | 11/1909 | Pfalzgraf | |
| 982,312 A | 1/1911 | Swafford | |
| 997,720 A | 7/1911 | Troupenat | |
| 1,037,843 A | 9/1912 | Ackley | |
| 1,050,649 A | 1/1913 | Harrold et al. | |
| 1,054,558 A | 2/1913 | Jones | |
| 1,074,198 A | 9/1913 | Phillips | |
| 1,082,870 A | 12/1913 | Humason | |
| 1,101,515 A | 6/1914 | Adam | |
| 1,126,970 A | 2/1915 | Folmer | |
| 1,132,129 A | 3/1915 | Stevens | |
| 1,148,169 A | 7/1915 | Howe | |
| 1,154,209 A | 9/1915 | Rushton | |
| 1,205,246 A | 11/1916 | Mowry | |
| 1,228,047 A | 5/1917 | Reinhold | |
| 1,240,430 A | 9/1917 | Erickson | |
| 1,244,187 A | 10/1917 | Frisbie | |
| 1,255,886 A | 2/1918 | Jones | |
| 1,258,961 A | 3/1918 | Tattersall | |
| 1,311,508 A | 7/1919 | Harrold | |
| 1,324,136 A | 12/1919 | Turner | |
| 1,381,612 A | 6/1921 | Anderson | |
| 1,397,606 A | 11/1921 | Smith | |
| 1,427,005 A | 8/1922 | McMichael | |
| 1,430,983 A | 10/1922 | Granberg | |
| 1,450,906 A | 4/1923 | Anderson | |
| 1,464,924 A | 8/1923 | Drummond | |
| 1,465,224 A | 8/1923 | Lantz | |
| 1,492,145 A | 4/1924 | Talley | |
| 1,496,212 A | 6/1924 | French | |
| 1,511,797 A | 10/1924 | Berghold | |
| 1,526,128 A | 2/1925 | Flohr | |
| 1,527,587 A | 2/1925 | Hutchinson | |
| 1,551,900 A | 9/1925 | Morrow | |
| 1,553,996 A | 9/1925 | Federer | |
| 1,582,483 A | 4/1926 | Runyan | |
| 1,590,988 A | 6/1926 | Campbell | |
| 1,600,604 A | 9/1926 | Sorlien | |
| 1,616,478 A | 2/1927 | Watson | |
| 1,640,517 A | 8/1927 | Procknow | |
| 1,662,372 A | 3/1928 | Ward | |
| 1,668,061 A | 5/1928 | Falkins | |
| 1,701,948 A | 2/1929 | Crowe | |
| 1,711,490 A | 5/1929 | Drummond | |
| 1,712,828 A | 5/1929 | Klehm | |
| 1,774,521 A | 9/1930 | Neighbour | |
| 1,807,120 A | 5/1931 | Lewis | |
| 1,811,066 A | 6/1931 | Tannewitz | |
| 1,879,280 A | 9/1932 | James | |
| 1,896,924 A | 2/1933 | Ulrich | |
| 1,902,270 A | 3/1933 | Tate | |
| 1,904,005 A | 4/1933 | Masset | |
| 1,910,651 A | 5/1933 | Tautz | |
| 1,938,548 A | 12/1933 | Tautz | |
| 1,938,549 A | 12/1933 | Tautz | |
| 1,963,688 A | 6/1934 | Tautz | |
| 1,988,102 A | 1/1935 | Woodward | |
| 1,993,219 A | 3/1935 | Merrigan | |
| 2,007,887 A | 7/1935 | Tautz | |
| 2,010,851 A | 8/1935 | Drummond | |
| 2,020,222 A | 11/1935 | Tautz | |
| 2,038,810 A | 4/1936 | Tautz | |
| 2,075,282 A | 3/1937 | Hedgpeth | |
| 2,095,330 A | 10/1937 | Hedgpeth | |
| 2,106,288 A | 1/1938 | Tautz | |
| 2,106,321 A | 1/1938 | Guertin | |
| 2,121,069 A | 6/1938 | Collins | |
| 2,131,492 A | 9/1938 | Ocenasek | |
| 2,163,320 A | 6/1939 | Hammond | |
| 2,168,282 A | 8/1939 | Tautz | |
| 2,241,556 A | 5/1941 | MacMillin et al. | |
| 2,261,696 A | 11/1941 | Ocenasek | |
| 2,265,407 A | 12/1941 | Tautz | |
| 2,286,589 A | 6/1942 | Tannewitz | |
| 2,292,872 A | 8/1942 | Eastman | |
| 2,299,262 A | 10/1942 | Uremovich | |
| 2,312,118 A | 2/1943 | Neisewander | |
| 2,313,686 A | 3/1943 | Uremovich | |
| 2,328,244 A | 8/1943 | Woodward | |
| 2,352,235 A | 6/1944 | Tautz | |
| 2,377,265 A | 3/1945 | Rady | |
| 2,392,486 A | 1/1946 | Larsen | |
| 2,402,232 A | 6/1946 | Baker | |
| 2,425,331 A | 8/1947 | Kramer | |
| 2,434,174 A | 1/1948 | Morgan | |
| 2,452,589 A | 11/1948 | McWhirter et al. | |
| 2,466,325 A | 4/1949 | Ocenasek | |
| 2,496,613 A | 2/1950 | Woodward | |
| 2,501,134 A | 3/1950 | Meckoski et al. | |
| 2,509,813 A | 5/1950 | Dineen | |
| 2,517,649 A | 8/1950 | Frechtmann | |
| 2,518,684 A | 8/1950 | Harris | |
| 2,530,290 A | 11/1950 | Collins | |
| 2,554,124 A | 5/1951 | Salmont | |
| 2,562,396 A | 7/1951 | Schutz | |
| 2,572,326 A | 10/1951 | Evans | |
| 2,590,035 A | 3/1952 | Pollak | |
| 2,593,596 A | 4/1952 | Olson | |
| 2,601,878 A | 7/1952 | Anderson | |
| 2,623,555 A | 12/1952 | Eschenburg | |
| 2,625,966 A | 1/1953 | Copp | |
| 2,626,639 A | 1/1953 | Hess | |
| 2,661,777 A | 12/1953 | Hitchcock | |
| 2,661,780 A | 12/1953 | Morgan | |
| 2,675,707 A | 4/1954 | Brown | |
| 2,678,071 A | 5/1954 | Odlum et al. | |
| 2,690,084 A | 9/1954 | Van Dam | |
| 2,695,638 A | 11/1954 | Gaskell | |
| 2,704,560 A | 3/1955 | Woessner | |
| 2,711,762 A | 6/1955 | Gaskell | |
| 2,719,547 A | 10/1955 | Gjerde | |
| 2,722,246 A | 11/1955 | Arnoldy | |
| 2,731,049 A | 1/1956 | Akin | |
| 2,736,348 A | 2/1956 | Nelson | |
| 2,737,213 A | 3/1956 | Richards et al. | |
| 2,758,615 A | 8/1956 | Mastriforte | |
| 2,785,710 A | 3/1957 | Mowery, Jr. | |
| 2,786,496 A | 3/1957 | Eschenburg | |
| 2,804,890 A | 9/1957 | Fink | |
| 2,810,408 A | 10/1957 | Boice et al. | |
| 2,839,943 A | 6/1958 | Caldwell et al. | |
| 2,844,173 A | 7/1958 | Gaskell | |
| 2,850,054 A | 9/1958 | Eschenburg | |
| 2,852,047 A | 9/1958 | Odlum et al. | |
| 2,873,773 A | 2/1959 | Gaskell | |
| 2,876,809 A | 3/1959 | Rentsch et al. | |
| 2,883,486 A | 4/1959 | Mason | |
| 2,894,546 A | 7/1959 | Eschenburg | |
| 2,913,025 A | 11/1959 | Richards | |
| 2,913,581 A | 11/1959 | Simonton et al. | |
| 2,937,672 A | 5/1960 | Gjerde | |
| 2,945,516 A | 7/1960 | Edgemond, Jr. et al. | |
| 2,954,118 A | 9/1960 | Anderson | |
| 2,957,166 A | 10/1960 | Gluck | |
| 2,978,084 A | 4/1961 | Vilkaitis | |
| 2,984,268 A | 5/1961 | Vuichard | |
| 2,991,593 A | 7/1961 | Cohen | |
| 3,005,477 A | 10/1961 | Sherwen | |
| 3,011,529 A | 12/1961 | Copp | |
| 3,011,610 A | 12/1961 | Stiebel et al. | |
| 3,013,592 A | 12/1961 | Ambrosio et al. | |
| 3,021,881 A | 2/1962 | Edgemond, Jr. et al. | |
| 3,035,995 A | 5/1962 | Seeley et al. | |
| 3,047,116 A | 7/1962 | Stiebel et al. | |
| 3,085,602 A | 4/1963 | Gaskell | |
| 3,105,530 A | 10/1963 | Peterson | |
| 3,129,731 A | 4/1964 | Tyrrell | |
| 3,163,732 A | 12/1964 | Abbott | |
| 3,184,001 A | 5/1965 | Reinsch et al. | |
| 3,186,256 A | 6/1965 | Reznick | |

| | | | | | |
|---|---|---|---|---|---|
| 3,207,273 A | 9/1965 | Jurin | 4,047,156 A | 9/1977 | Atkins |
| 3,213,731 A | 10/1965 | Renard | 4,048,886 A | 9/1977 | Zettler |
| 3,224,474 A | 12/1965 | Bloom | 4,060,160 A | 11/1977 | Lieber |
| 3,232,326 A | 2/1966 | Speer et al. | 4,070,940 A | 1/1978 | McDaniel et al. |
| 3,246,205 A | 4/1966 | Miller | 4,075,961 A | 2/1978 | Harris |
| 3,249,134 A | 5/1966 | Vogl et al. | 4,077,161 A | 3/1978 | Wyle et al. |
| 3,274,876 A | 9/1966 | Debus | 4,085,303 A | 4/1978 | McIntyre et al. |
| 3,276,497 A | 10/1966 | Heer | 4,090,345 A | 5/1978 | Harkness |
| 3,306,149 A | 2/1967 | John | 4,091,698 A | 5/1978 | Obear et al. |
| 3,313,185 A | 4/1967 | Drake et al. | 4,106,378 A | 8/1978 | Kaiser |
| 3,315,715 A | 4/1967 | Mytinger | 4,117,752 A | 10/1978 | Yoneda |
| 3,323,814 A | 6/1967 | Phillips | 4,145,940 A | 3/1979 | Woloveke et al. |
| 3,337,008 A | 8/1967 | Trachte | 4,152,833 A | 5/1979 | Phillips |
| 3,356,111 A | 12/1967 | Mitchell | 4,161,649 A | 7/1979 | Klos et al. |
| 3,368,596 A | 2/1968 | Corner | 4,175,452 A | 11/1979 | Idel |
| 3,386,322 A | 6/1968 | Stone et al. | 4,184,394 A | 1/1980 | Gjerde |
| 3,439,183 A | 4/1969 | Hurst, Jr. | 4,190,000 A | 2/1980 | Shaull et al. |
| 3,445,835 A | 5/1969 | Fudaley | 4,195,722 A | 4/1980 | Anderson et al. |
| 3,454,286 A | 7/1969 | Anderson et al. | 4,199,930 A | 4/1980 | Lebet et al. |
| 3,456,696 A | 7/1969 | Gregory et al. | 4,206,666 A | 6/1980 | Ashton |
| 3,512,440 A | 5/1970 | Frydmann | 4,206,910 A | 6/1980 | Biesemeyer |
| 3,538,964 A | 11/1970 | Warrick et al. | 4,249,117 A | 2/1981 | Leukhardt et al. |
| 3,540,338 A | 11/1970 | McEwan et al. | 4,249,442 A | 2/1981 | Fittery |
| 3,554,067 A | 1/1971 | Scutella | 4,262,278 A | 4/1981 | Howard et al. |
| 3,566,996 A | 3/1971 | Crossman | 4,267,914 A | 5/1981 | Saar |
| 3,580,376 A | 5/1971 | Loshbough | 4,270,427 A | 6/1981 | Colberg et al. |
| 3,581,784 A | 6/1971 | Warrick | 4,276,459 A | 6/1981 | Willett et al. |
| 3,593,266 A | 7/1971 | Van Sickle | 4,276,799 A | 7/1981 | Muehling |
| 3,613,748 A | 10/1971 | De Pue | 4,291,794 A | 9/1981 | Bauer |
| 3,621,894 A | 11/1971 | Niksich | 4,305,442 A | 12/1981 | Currie |
| 3,670,788 A | 6/1972 | Pollak et al. | 4,319,146 A | 3/1982 | Wires, Sr. |
| 3,675,444 A | 7/1972 | Whipple | 4,321,841 A | 3/1982 | Felix |
| 3,680,609 A | 8/1972 | Menge | 4,334,450 A | 6/1982 | Benuzzi |
| 3,688,815 A | 9/1972 | Ridenour | 4,372,202 A | 2/1983 | Cameron |
| 3,695,116 A | 10/1972 | Baur | 4,374,552 A | 2/1983 | Dayen |
| 3,696,844 A | 10/1972 | Bernatschek | 4,385,539 A | 5/1983 | Meyerhoefer et al. |
| 3,716,113 A | 2/1973 | Kobayashi et al. | 4,391,358 A | 7/1983 | Haeger |
| 3,719,103 A | 3/1973 | Streander | 4,418,597 A | 12/1983 | Krusemark et al. |
| 3,740,000 A | 6/1973 | Takada | 4,427,042 A | 1/1984 | Mitchell et al. |
| 3,745,546 A | 7/1973 | Struger et al. | 4,466,170 A | 8/1984 | Davis |
| 3,749,933 A | 7/1973 | Davidson | 4,466,233 A | 8/1984 | Thesman |
| 3,754,493 A | 8/1973 | Niehaus et al. | 4,470,046 A | 9/1984 | Betsill |
| 3,772,590 A | 11/1973 | Mikulecky et al. | 4,503,739 A | 3/1985 | Konieczka |
| 3,785,230 A | 1/1974 | Lokey | 4,510,489 A | 4/1985 | Anderson, III et al. |
| 3,793,915 A | 2/1974 | Hujer | 4,512,224 A | 4/1985 | Terauchi |
| 3,805,639 A | 4/1974 | Peter | 4,518,043 A | 5/1985 | Anderson et al. |
| 3,805,658 A | 4/1974 | Scott et al. | 4,532,501 A | 7/1985 | Hoffman |
| 3,808,932 A | 5/1974 | Russell | 4,532,844 A | 8/1985 | Chang et al. |
| 3,829,850 A | 8/1974 | Guetersloh | 4,557,168 A | 12/1985 | Tokiwa |
| 3,829,970 A | 8/1974 | Anderson | 4,559,858 A | 12/1985 | Laskowski et al. |
| 3,858,095 A | 12/1974 | Friemann et al. | 4,560,033 A | 12/1985 | DeWoody et al. |
| 3,861,016 A | 1/1975 | Johnson et al. | 4,566,512 A | 1/1986 | Wilson |
| 3,863,208 A | 1/1975 | Balban | 4,573,556 A | 3/1986 | Andreasson |
| 3,874,747 A | 4/1975 | Case et al. | 4,576,073 A | 3/1986 | Stinson |
| 3,880,032 A | 4/1975 | Green | 4,589,047 A | 5/1986 | Gaus et al. |
| 3,882,744 A | 5/1975 | McCarroll | 4,589,860 A | 5/1986 | Brandenstein et al. |
| 3,886,413 A | 5/1975 | Dow et al. | 4,599,597 A | 7/1986 | Rotbart |
| 3,889,567 A | 6/1975 | Sato et al. | 4,599,927 A | 7/1986 | Eccardt et al. |
| 3,905,263 A | 9/1975 | Smith | 4,606,251 A | 8/1986 | Boileau |
| 3,922,785 A | 12/1975 | Fushiya | 4,615,247 A | 10/1986 | Berkeley |
| 3,924,688 A | 12/1975 | Cooper et al. | 4,621,300 A | 11/1986 | Summerer |
| 3,931,727 A | 1/1976 | Luenser | 4,625,604 A | 12/1986 | Handler et al. |
| 3,935,777 A | 2/1976 | Bassett | 4,637,188 A | 1/1987 | Crothers |
| 3,945,286 A | 3/1976 | Smith | 4,637,289 A | 1/1987 | Ramsden |
| 3,946,631 A | 3/1976 | Malm | 4,644,832 A | 2/1987 | Smith |
| 3,947,734 A | 3/1976 | Fyler | 4,653,189 A | 3/1987 | Andreasson |
| 3,949,636 A | 4/1976 | Ball et al. | 4,657,428 A | 4/1987 | Wiley |
| 3,953,770 A | 4/1976 | Hayashi | 4,661,797 A | 4/1987 | Schmall |
| 3,960,310 A | 6/1976 | Nussbaum | 4,672,500 A | 6/1987 | Tholome et al. |
| 3,967,161 A | 6/1976 | Lichtblau | 4,675,664 A | 6/1987 | Cloutier et al. |
| 3,974,565 A | 8/1976 | Ellis | 4,679,719 A | 7/1987 | Kramer |
| 3,975,600 A | 8/1976 | Marston | 4,718,229 A | 1/1988 | Riley |
| 3,978,624 A | 9/1976 | Merkel et al. | 4,722,021 A | 1/1988 | Hornung et al. |
| 3,994,192 A | 11/1976 | Faig | 4,751,603 A | 6/1988 | Kwan |
| 4,007,679 A | 2/1977 | Edwards | 4,756,220 A | 7/1988 | Olsen et al. |
| 4,016,490 A | 4/1977 | Weckenmann et al. | 4,757,881 A | 7/1988 | Jonsson et al. |
| 4,026,174 A | 5/1977 | Fierro | 4,774,866 A | 10/1988 | Dehari et al. |
| 4,026,177 A | 5/1977 | Lokey | 4,792,965 A | 12/1988 | Morgan |
| 4,029,159 A | 6/1977 | Nymann | 4,805,504 A | 2/1989 | Fushiya et al. |

| | | | | | |
|---|---|---|---|---|---|
| 4,831,279 A | 5/1989 | Ingraham | 5,623,860 A | 4/1997 | Schoene et al. |
| 4,840,135 A | 6/1989 | Yamauchi | 5,647,258 A | 7/1997 | Brazell et al. |
| 4,845,476 A | 7/1989 | Rangeard et al. | 5,648,644 A | 7/1997 | Nagel |
| 4,864,455 A | 9/1989 | Shimomura et al. | 5,659,454 A | 8/1997 | Vermesse |
| 4,875,398 A | 10/1989 | Taylor et al. | 5,667,152 A | 9/1997 | Mooring |
| 4,888,869 A | 12/1989 | Leatherman | 5,671,633 A | 9/1997 | Wagner |
| 4,896,607 A | 1/1990 | Hall et al. | 5,695,306 A | 12/1997 | Nygren, Jr. |
| 4,906,962 A | 3/1990 | Duimstra | 5,700,165 A | 12/1997 | Harris et al. |
| 4,907,679 A | 3/1990 | Menke | 5,720,213 A | 2/1998 | Sberveglieri |
| 4,934,233 A | 6/1990 | Brundage et al. | 5,722,308 A | 3/1998 | Ceroll et al. |
| 4,936,876 A | 6/1990 | Reyes | 5,724,875 A | 3/1998 | Meredith et al. |
| 4,937,554 A | 6/1990 | Herman | 5,730,165 A | 3/1998 | Philipp |
| 4,962,685 A | 10/1990 | Hagstrom | 5,741,048 A | 4/1998 | Eccleston |
| 4,964,450 A | 10/1990 | Hughes et al. | 5,755,148 A | 5/1998 | Stumpf et al. |
| 4,965,909 A | 10/1990 | McCullough et al. | 5,771,742 A | 6/1998 | Bokaie et al. |
| 4,975,798 A | 12/1990 | Edwards et al. | 5,782,001 A | 7/1998 | Gray |
| 5,020,406 A | 6/1991 | Sasaki et al. | 5,787,779 A | 8/1998 | Garuglieri |
| 5,025,175 A | 6/1991 | Dubois, III | 5,791,057 A | 8/1998 | Nakamura et al. |
| 5,042,348 A | 8/1991 | Brundage et al. | 5,791,223 A | 8/1998 | Lanzer |
| 5,046,426 A | 9/1991 | Julien et al. | 5,791,224 A | 8/1998 | Suzuki et al. |
| 5,052,255 A | 10/1991 | Gaines | 5,791,441 A | 8/1998 | Matos et al. |
| 5,074,047 A | 12/1991 | King | 5,797,307 A | 8/1998 | Horton |
| 5,081,406 A | 1/1992 | Hughes et al. | 5,819,619 A | 10/1998 | Miller et al. |
| 5,082,316 A | 1/1992 | Wardlaw | 5,819,625 A | 10/1998 | Sberveglieri |
| 5,083,973 A | 1/1992 | Townsend | 5,852,951 A | 12/1998 | Santi |
| 5,086,890 A | 2/1992 | Turczyn et al. | 5,857,507 A | 1/1999 | Puzio et al. |
| 5,094,000 A | 3/1992 | Becht et al. | 5,861,809 A | 1/1999 | Eckstein et al. |
| 5,116,249 A | 5/1992 | Shiotani et al. | 5,875,698 A | 3/1999 | Ceroll et al. |
| 5,119,555 A | 6/1992 | Johnson | 5,880,954 A | 3/1999 | Thomson et al. |
| 5,122,091 A | 6/1992 | Townsend | 5,921,367 A | 7/1999 | Kashioka et al. |
| 5,146,714 A | 9/1992 | Liiber | 5,927,857 A | 7/1999 | Ceroll et al. |
| 5,174,349 A | 12/1992 | Svetlik et al. | 5,930,096 A | 7/1999 | Kim |
| 5,184,534 A | 2/1993 | Lee | 5,937,720 A | 8/1999 | Itzov |
| 5,198,702 A | 3/1993 | McCullough et al. | 5,942,975 A | 8/1999 | Sorensen |
| 5,199,343 A | 4/1993 | OBanion | 5,943,932 A | 8/1999 | Sberveglieri |
| 5,201,110 A | 4/1993 | Bane | 5,950,514 A | 9/1999 | Benedict et al. |
| 5,201,684 A | 4/1993 | DeBois, III | 5,963,173 A | 10/1999 | Lian et al. |
| 5,206,625 A | 4/1993 | Davis | 5,974,927 A | 11/1999 | Tsune |
| 5,207,253 A | 5/1993 | Hoshino et al. | 5,989,116 A | 11/1999 | Johnson et al. |
| 5,212,621 A | 5/1993 | Panter | 6,009,782 A | 1/2000 | Tajima et al. |
| 5,218,189 A | 6/1993 | Hutchison | 6,018,284 A | 1/2000 | Rival et al. |
| 5,231,359 A | 7/1993 | Masuda et al. | 6,037,729 A | 3/2000 | Woods et al. |
| 5,231,906 A | 8/1993 | Kogej | 6,052,884 A | 4/2000 | Steckler et al. |
| 5,239,978 A | 8/1993 | Plangetis | 6,062,121 A | 5/2000 | Ceroll et al. |
| 5,245,879 A | 9/1993 | McKeon | 6,070,484 A | 6/2000 | Sakamaki |
| 5,257,570 A | 11/1993 | Shiotani et al. | 6,095,092 A | 8/2000 | Chou |
| 5,265,510 A | 11/1993 | Hoyer-Ellefsen | 6,112,785 A | 9/2000 | Yu |
| 5,272,946 A | 12/1993 | McCullough et al. | 6,119,984 A | 9/2000 | Devine |
| 5,276,431 A | 1/1994 | Piccoli et al. | 6,133,818 A | 10/2000 | Hsieh et al. |
| 5,285,708 A | 2/1994 | Bosten et al. | 6,141,192 A | 10/2000 | Garzon |
| 5,293,802 A | 3/1994 | Shiotani et al. | 6,148,504 A | 11/2000 | Schmidt et al. |
| 5,320,382 A | 6/1994 | Goldstein et al. | 6,148,703 A | 11/2000 | Ceroll et al. |
| 5,321,230 A | 6/1994 | Shanklin et al. | 6,150,826 A | 11/2000 | Hokodate et al. |
| 5,331,875 A | 7/1994 | Mayfield | 6,161,459 A | 12/2000 | Ceroll et al. |
| 5,353,670 A | 10/1994 | Metzger, Jr. | 6,170,370 B1 | 1/2001 | Sommerville |
| 5,377,554 A | 1/1995 | Reulein et al. | 6,244,149 B1 | 6/2001 | Ceroll et al. |
| 5,377,571 A | 1/1995 | Josephs | 6,250,190 B1 | 6/2001 | Ceroll et al. |
| 5,392,568 A | 2/1995 | Howard, Jr. et al. | 6,257,061 B1 | 7/2001 | Nonoyama et al. |
| 5,392,678 A | 2/1995 | Sasaki et al. | 6,283,002 B1 | 9/2001 | Chiang |
| 5,401,928 A | 3/1995 | Kelley | 6,295,910 B1 | 10/2001 | Childs et al. |
| 5,411,221 A | 5/1995 | Collins et al. | 6,325,195 B1 | 12/2001 | Doherty |
| 5,423,232 A | 6/1995 | Miller et al. | 6,330,848 B1 | 12/2001 | Nishio et al. |
| 5,436,613 A | 7/1995 | Ghosh et al. | 6,336,273 B1 | 1/2002 | Nilsson et al. |
| 5,447,085 A | 9/1995 | Gochnauer | 6,352,137 B1 | 3/2002 | Stegall et al. |
| 5,451,750 A | 9/1995 | An | 6,357,328 B1 | 3/2002 | Ceroll et al. |
| 5,453,903 A | 9/1995 | Chow | 6,366,099 B1 | 4/2002 | Reddi |
| 5,471,888 A | 12/1995 | McCormick | 6,376,939 B1 | 4/2002 | Suzuki et al. |
| 5,480,009 A | 1/1996 | Wieland et al. | 6,404,098 B1 | 6/2002 | Kayama et al. |
| 5,503,059 A | 4/1996 | Pacholok | 6,405,624 B2 | 6/2002 | Sutton |
| 5,510,587 A | 4/1996 | Reiter | 6,418,829 B1 | 7/2002 | Pilchowski |
| 5,510,685 A | 4/1996 | Grasselli | 6,420,814 B1 | 7/2002 | Bobbio |
| 5,513,548 A | 5/1996 | Garuglieri | 6,427,570 B1 | 8/2002 | Miller et al. |
| 5,531,147 A | 7/1996 | Serban | 6,430,007 B1 | 8/2002 | Jabbari |
| 5,534,836 A | 7/1996 | Schenkel et al. | 6,431,425 B1 | 8/2002 | Moorman et al. |
| 5,572,916 A | 11/1996 | Takano | 6,450,077 B1 | 9/2002 | Ceroll et al. |
| 5,587,618 A | 12/1996 | Hathaway | 6,453,786 B1 | 9/2002 | Ceroll et al. |
| 5,592,353 A | 1/1997 | Shinohara et al. | 6,460,442 B2 | 10/2002 | Talesky et al. |
| 5,606,889 A | 3/1997 | Bielinski et al. | 6,471,106 B1 | 10/2002 | Reining |
| 5,619,896 A | 4/1997 | Chen | 6,479,958 B1 | 11/2002 | Thompson et al. |

| Patent No. | Date | Name |
|---|---|---|
| 6,484,614 B1 | 11/2002 | Huang |
| D466,913 S | 12/2002 | Ceroll et al. |
| 6,492,802 B1 | 12/2002 | Bielski |
| D469,354 S | 1/2003 | Curtsinger |
| 6,502,493 B1 | 1/2003 | Eccardt et al. |
| 6,543,324 B2 | 4/2003 | Dils |
| 6,546,835 B2 | 4/2003 | Wang |
| 6,564,909 B1 | 5/2003 | Razzano |
| 6,575,067 B2 | 6/2003 | Parks et al. |
| 6,578,460 B2 | 6/2003 | Sartori |
| 6,578,856 B2 | 6/2003 | Kahle |
| 6,581,655 B2 | 6/2003 | Huang |
| 6,595,096 B2 | 7/2003 | Ceroll et al. |
| D478,917 S | 8/2003 | Ceroll et al. |
| 6,601,493 B1 | 8/2003 | Crofutt |
| 6,607,015 B1 | 8/2003 | Chen |
| D479,538 S | 9/2003 | Welsh et al. |
| 6,617,720 B1 | 9/2003 | Egan, III et al. |
| 6,619,348 B2 | 9/2003 | Wang |
| 6,640,683 B2 | 11/2003 | Lee |
| 6,644,157 B2 | 11/2003 | Huang |
| 6,647,847 B2 | 11/2003 | Hewitt et al. |
| 6,659,233 B2 | 12/2003 | DeVlieg |
| 6,684,750 B2 | 2/2004 | Yu |
| 6,722,242 B2 | 4/2004 | Chuang |
| 6,734,581 B1 | 5/2004 | Griffis |
| 6,736,042 B2 | 5/2004 | Behne et al. |
| 6,742,430 B2 | 6/2004 | Chen |
| 6,796,208 B1 | 9/2004 | Jorgensen |
| 6,800,819 B2 | 10/2004 | Sato et al. |
| 6,826,988 B2 | 12/2004 | Gass et al. |
| 6,826,992 B1 | 12/2004 | Huang |
| 6,840,144 B2 | 1/2005 | Huang |
| 6,854,371 B2 | 2/2005 | Yu |
| 6,857,345 B2 | 2/2005 | Gass et al. |
| 6,874,397 B2 | 4/2005 | Chang |
| 6,874,399 B2 | 4/2005 | Lee |
| 6,880,440 B2 | 4/2005 | Gass et al. |
| 6,889,585 B1 | 5/2005 | Harris et al. |
| 6,920,814 B2 | 7/2005 | Gass et al. |
| 6,922,153 B2 | 7/2005 | Pierga et al. |
| 6,945,148 B2 | 9/2005 | Gass et al. |
| 6,945,149 B2 | 9/2005 | Gass et al. |
| 6,968,767 B2 | 11/2005 | Yu |
| 6,986,370 B1 | 1/2006 | Schoene et al. |
| 7,024,975 B2 | 4/2006 | Gass et al. |
| 2001/0032534 A1 | 10/2001 | Ceroll et al. |
| 2002/0043776 A1 | 4/2002 | Chuang |
| 2002/0050201 A1 | 5/2002 | Lane et al. |
| 2002/0088325 A1 | 7/2002 | Talesky et al. |
| 2002/0096030 A1 | 7/2002 | Wang |
| 2002/0096591 A1 | 7/2002 | Tanji |
| 2002/0109036 A1 | 8/2002 | Denen et al. |
| 2002/0134212 A1 | 9/2002 | Ceroll et al. |
| 2002/0174755 A1 | 11/2002 | Behne et al. |
| 2003/0000359 A1 | 1/2003 | Eccardt et al. |
| 2003/0037655 A1 | 2/2003 | Chin-Chin |
| 2003/0074873 A1 | 4/2003 | Freiberg et al. |
| 2003/0089212 A1 | 5/2003 | Parks et al. |
| 2003/0101857 A1 | 6/2003 | Chuang |
| 2003/0109798 A1 | 6/2003 | Kermani |
| 2003/0213349 A1 | 11/2003 | Chang |
| 2004/0011177 A1 | 1/2004 | Huang |
| 2004/0060404 A1 | 4/2004 | Metzger, Jr. |
| 2004/0104085 A1 | 6/2004 | Lang et al. |
| 2004/0159198 A1 | 8/2004 | Peot et al. |
| 2004/0194594 A1 | 10/2004 | Dils et al. |
| 2004/0200329 A1 | 10/2004 | Sako |
| 2004/0226424 A1 | 11/2004 | O'Banion et al. |
| 2004/0226800 A1 | 11/2004 | Pierga et al. |
| 2004/0255745 A1 | 12/2004 | Peot et al. |
| 2005/0057206 A1 | 3/2005 | Uneyama |
| 2005/0092149 A1 | 5/2005 | Hartmann |
| 2005/0139051 A1 | 6/2005 | Gass et al. |
| 2005/0139056 A1 | 6/2005 | Gass et al. |
| 2005/0139057 A1 | 6/2005 | Gass et al. |
| 2005/0139058 A1 | 6/2005 | Gass et al. |
| 2005/0139459 A1 | 6/2005 | Gass et al. |
| 2005/0155473 A1 | 7/2005 | Gass |
| 2005/0166736 A1 | 8/2005 | Gass et al. |
| 2005/0178259 A1 | 8/2005 | Gass et al. |
| 2005/0204885 A1 | 9/2005 | Gass et al. |
| 2005/0211034 A1 | 9/2005 | Sasaki et al. |
| 2005/0235793 A1 | 10/2005 | O'Banion et al. |
| 2005/0274432 A1 | 12/2005 | Gass et al. |
| 2006/0000337 A1 | 1/2006 | Gass |
| 2006/0032352 A1 | 2/2006 | Gass et al. |
| 2006/0123960 A1 | 6/2006 | Gass et al. |
| 2006/0123964 A1 | 6/2006 | Gass et al. |

FOREIGN PATENT DOCUMENTS

| | | |
|---|---|---|
| CH | 297525 | 6/1954 |
| DE | 76186 | 8/1921 |
| DE | 2917497 | 4/1979 |
| DE | 2800403 | 7/1979 |
| DE | 3427733 | 1/1986 |
| DE | 4235161 | 5/1993 |
| DE | 4326313 | 2/1995 |
| DE | 19609771 | 6/1998 |
| EP | 146460 | 11/1988 |
| EP | 0362937 | 4/1990 |
| ES | 2152184 | 1/2001 |
| FR | 2556643 | 6/1985 |
| FR | 2570017 | 3/1986 |
| GB | 598204 | 2/1948 |
| GB | 1132708 | 11/1968 |
| GB | 2096844 | 10/1982 |
| GB | 2142571 | 1/1985 |

OTHER PUBLICATIONS

Shop Fox® Fence Operating Manual, Woodstock International, Inc., 1996, revised May 1997.
Gordon Engineering Corp., Product Catalog, pp. cover, 1, 3 and back, Brookfield, Connecticut, US, Oct. 1997.
Analog Devices, Inc., 3-Axis Capacitive Sensor—Preliminary Technical Data AD7103, pp. 1-40, © 1998.
Excaliber T-Slot Precision Saw Fence Model TT45 Owner's Manual, Sommerville Design & Manufacturing, Inc., May 2000.
Bosch Model 4000 Worksite Table Saw Operating/Safety Instructions, S-B Power Tool Company, Jul. 2000.
XACTA Fence II™ Homeshop 30/52 Owner's Manual, JET Equipment & Tools, Mar. 2001.
XACTA Fence II™ Commercial 30/50 Owner's Manual, JET Equipment & Tools, Mar. 2001.
Bosch 10" Table Saw Model 0601476139 Parts List and Technical Bulletin, S-B Power Tool Company, Apr. 2001.
Biesemeyer® T-Square® Universal Home Shop Fence system Instruction Manual, Delta Machinery, Jun. 1, 2001.
Powermatic 10" Tilting Arbor Saw Model 66 Instruction Manual & Parts List, JET Equipment & Tools, Jun. 2001.
Skil Model 3400 Table Saw Operating/Safety Instructions, S-B Power Tool Co., Sep. 2001.
Tablesaw Splitters and Blade Covers, *Fine Woodworking*, pp. 77-81, Dec. 2001.
The Merlin Splitter by Excalibur a Sommerville Design Product Overview & Generic Installation Notes, Sommerville Design & Manufacturing Inc., at least as early as 2002.
INCRA Incremental Micro Precision Table Saw Fence Owner's Manual, Taylor Design Group, Inc., 2003.
Shop Fox® Models W2005, W2006, W2007 Classic Fence Instruction Manual, Woodstock International, Jan. 2000, revised Mar. 2004.
ACCU-FENCE® 64A Fence and Rail System Owner's Manual, WMH Tool Group, Sep. 2004.
Unifence™ Saw Guide Instruction Manual, Delta Machinery, Feb. 22, 2005.
Biesemeyer® T-Square® Commercial Fence System Instruction Manual, Delta Machinery, May 2, 2005.
Young Inventor: Teen's Device Earns Her Trip to Science Fair, *The Arizona Republic*, May 5, 2006.
Laguna Tools table saw owner's manual, date unknown.
Operator Injury Mitigation Using Electronic Sensing and Mechanical Braking and Decoupling Devices in Handheld Circular Saws, Erin F. Eppard, date unknown.
*You Should Have Invented It*, French television show DVD, date unknown.

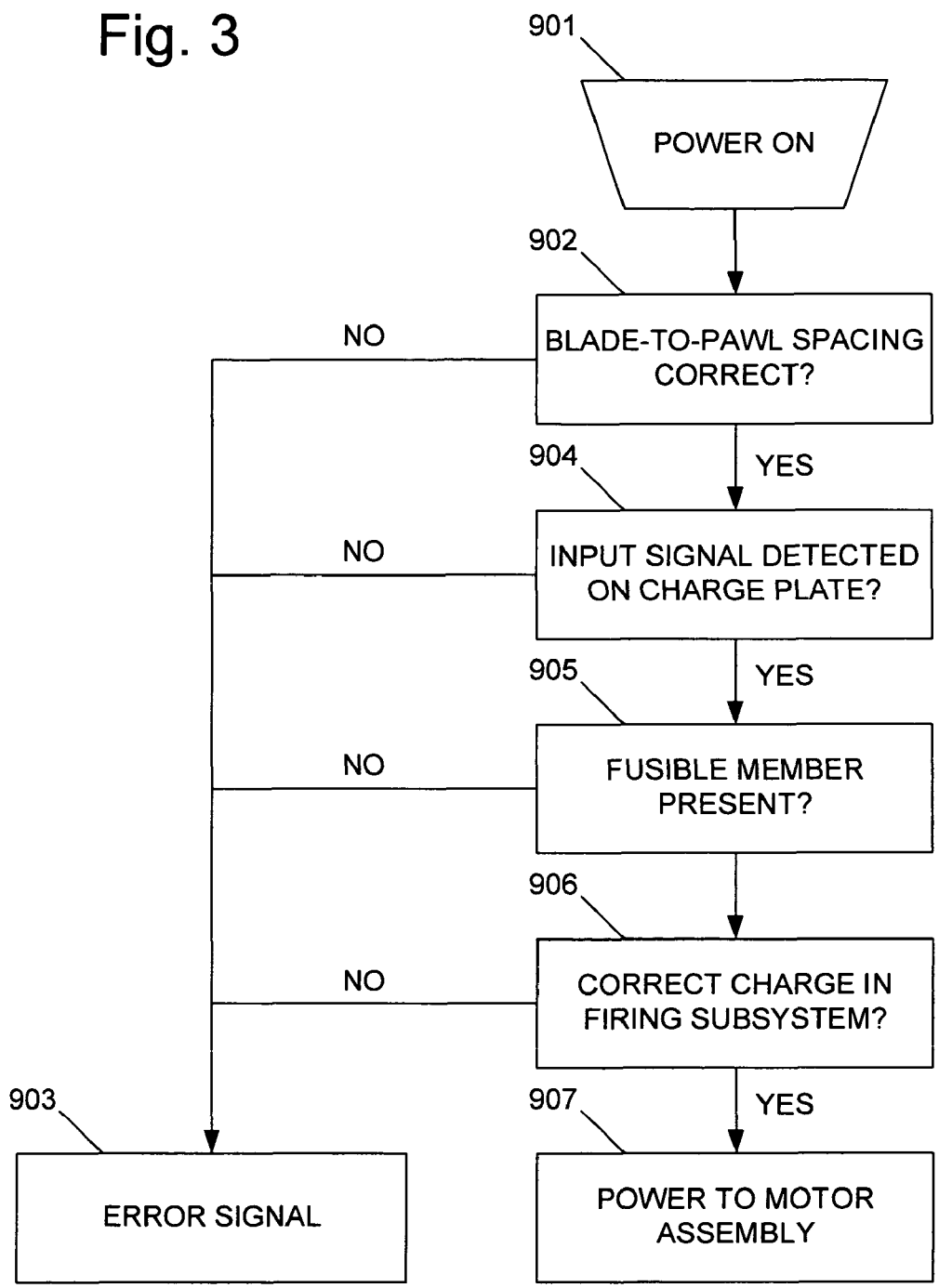

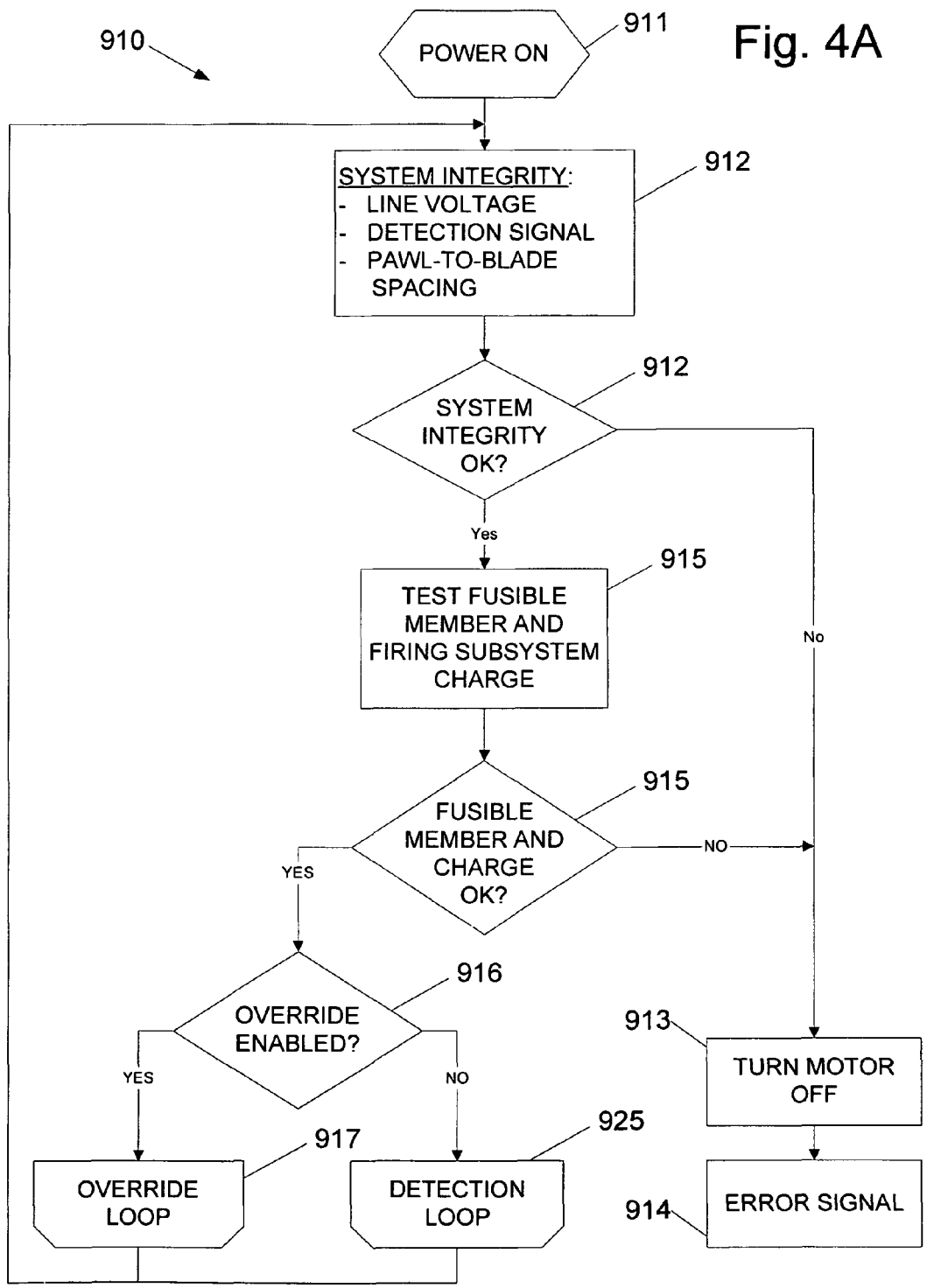

LOGIC CONTROL FOR FAST-ACTING SAFETY SYSTEM

CROSS-REFERENCE TO RELATED APPLICATIONS

This application is a divisional continuation of U.S. patent application Ser. No. 12/587,695, filed Oct. 9, 2009, issuing as U.S. Pat. No. 7,921,754 on Apr. 12, 2011, which in turn is a divisional continuation of U.S. patent application Ser. No. 09/929,237 filed Aug. 13, 2001 issuing as U.S. Pat. No. 7,600,455 on Oct. 13, 2009, which in turn claimed the benefit of and priority from the following U.S. Provisional Patent Applications: Ser. No. 60/225,056, filed Aug. 14, 2000, Ser. No. 60/225,057, filed Aug. 14, 2000, Ser. No. 60/225,058, filed Aug. 14, 2000, Ser. No. 60/225,059, filed Aug. 14, 2000, Ser. No. 60/225,089, filed Aug. 14, 2000, Ser. No. 60/225,094, filed Aug. 14, 2000, Ser. No. 60/225,169, filed Aug. 14, 2000, Ser. No. 60/225,170, filed Aug. 14, 2000, Ser. No. 60/225,200, filed Aug. 14, 2000, Ser. No. 60/225,201, filed Aug. 14, 2000, Ser. No. 60/225,206, filed Aug. 14, 2000, Ser. No. 60/225,210, filed Aug. 14, 2000, Ser. No. 60/225,211, filed Aug. 14, 2000, and Ser. No. 60/225,212, filed Aug. 14, 2000. The complete disclosures of these applications are hereby incorporated by reference in their entireties.

FIELD

The present invention relates to safety systems, and more particularly to a high-speed safety system for use on power equipment.

BACKGROUND

Beginning with the industrial revolution and continuing to the present, mechanized equipment has allowed workers to produce goods with greater speed and less effort than possible with manually-powered tools. Unfortunately, the power and high operating speeds of mechanized equipment creates a risk for those operating such machinery. Each year thousands of people are maimed or killed by accidents involving power equipment.

As might be expected, many systems have been developed to minimize the risk of injury when using power equipment. Probably the most common safety feature is a guard that physically blocks an operator from making contact with dangerous components of machinery, such as belts, shafts or blades. In many cases, guards are effective to reduce the risk of injury, however, there are many instances where the nature of the operations to be performed precludes using a guard that completely blocks access to hazardous machine parts.

Various systems have been proposed to prevent accidental injury where guards cannot effectively be employed. For instance, U.S. Pat. Nos. 941,726, 2,978,084, 3,011,610, 3,047,116, 4,195,722 and 4,321,841, the disclosures of which are incorporated herein by reference, all disclose safety systems for use with power presses. These systems utilize cables attached to the wrists of the operator that either pull back a user's hands from the work zone upon operation or prevent operation until the user's hands are outside the danger zone. U.S. Pat. Nos. 3,953,770, 4,075,961, 4,470,046, 4,532,501 and 5,212,621, the disclosures of which are incorporated herein by reference, disclose radio-frequency safety systems which utilize radio-frequency signals to detect the presence of a user's hand in a dangerous area of the machine and thereupon prevent or interrupt operation of the machine.

U.S. Pat. Nos. 4,959,909, 5,025,175, 5,122,091, 5,198,702, 5,201,684, 5,272,946, and 5,510,685 disclose safety systems for use with meat-skinning equipment, and are incorporated herein by reference. These systems interrupt or reverse power to the motor, or disengage a clutch, upon contact with a user's hand by any dangerous portion of the machine. Typically, contact between the user and the machine is detected by monitoring for electrical contact between a fine wire mesh in a glove worn by the user and some metal component in the dangerous area of the machine. Although such systems are suitable for use with meat skinning machines, they are relatively slow to stop the motion of the cutting element because they rely on the operation of solenoids or must overcome the inertia of the motor. However, because these systems operate at relatively low speeds, the blade does not need to be stopped rapidly to prevent serious injury to the user.

U.S. Pat. Nos. 3,785,230 and 4,026,177, the disclosures of which are herein incorporated by reference, disclose a safety system for use on circular saws to stop the blade when a user's hand approaches the blade. The system uses the blade as an antenna in an electromagnetic proximity detector to detect the approach of a user's hand prior to actual contact with the blade. Upon detection of a user's hand, the system engages a brake using a standard solenoid. Unfortunately, such a system is prone to false triggers and is relatively slow acting because of the solenoid. U.S. Pat. No. 4,117,752, which is herein incorporated by reference, discloses a similar braking system for use with a band saw, where the brake is triggered by actual contact between the user's hand and the blade. However, the system described for detecting blade contact does not appear to be functional to accurately and reliably detect contact. Furthermore, the system relies on standard electromagnetic brakes operating off of line voltage to stop the blade and pulleys of the band saw. It is believed that such brakes would take 50 ms-1 s to stop the blade. Therefore, the system is too slow to stop the blade quickly enough to avoid serious injury.

None of the safety systems mentioned above disclose any method or mechanism for ensuring that the system is operational before setting the blade or other dangerous portion of the machine in motion. In addition, none of the systems mentioned above disclose any method or mechanism for preventing false triggers during initial startup or for monitoring the operating status of the machinery to prevent triggering the safety system when the blade is stationary. Further, none of the above-mentioned systems disclose any method or mechanism for allowing a user to disable the safety system under certain conditions.

BRIEF DESCRIPTION OF THE DRAWINGS

FIG. 3 is a flowchart diagram of an exemplary self-test logic sequence according to the present invention.

FIGS. 4A-C are flowchart diagrams of an exemplary self-test and operational sequence according to the present invention.

DETAILED DESCRIPTION

Figure 1:
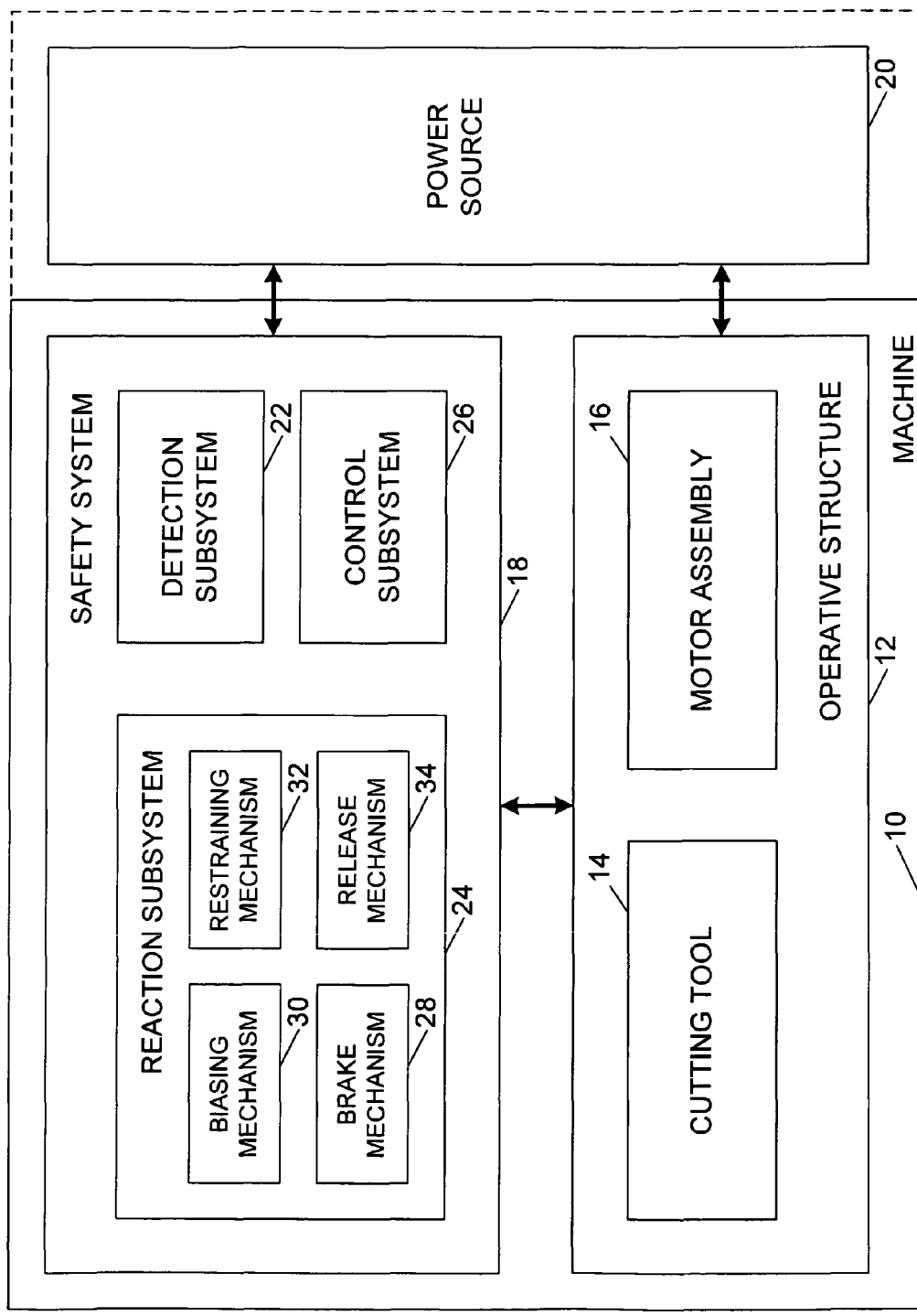
FIG. 1 is a schematic block diagram of a machine with a fast-acting safety system according to the present invention.

A machine according to the present invention is shown schematically in FIG. 1 and indicated generally at 10. Machine 10 may be any of a variety of different machines adapted for cutting workpieces, such as wood, including a table saw, miter saw (chop saw), radial arm saw, circular saw, band saw, jointer, planer, etc. Machine 10 includes an operative structure 12 having a cutting tool 14 and a motor assembly 16 adapted to drive the cutting tool. Machine 10 also includes a safety system 18 configured to minimize the potential of a serious injury to a person using machine 10. Safety system 18 is adapted to detect the occurrence of one or more dangerous conditions during use of machine 10. If such a dangerous condition is detected, safety system 18 is adapted to engage operative structure 12 to limit any injury to the user caused by the dangerous condition.

Machine 10 also includes a suitable power source 20 to provide power to operative structure 12 and safety system 18. Power source 20 may be an external power source such as line current, or an internal power source such as a battery. Alternatively, power source 20 may include a combination of both external and internal power sources. Furthermore, power source 20 may include two or more separate power sources, each adapted to power different portions of machine 10.

It will be appreciated that operative structure 12 may take any one of many different forms, depending on the type of machine 10. For example, operative structure 12 may include a stationary housing configured to support motor assembly 16 in driving engagement with cutting tool 14. Alternatively, operative structure 12 may include a movable structure configured to carry cutting tool 14 between multiple operating positions. As a further alternative, operative structure 12 may include one or more transport mechanisms adapted to convey a workpiece toward and/or away from cutting tool 14.

Motor assembly 16 includes one or more motors adapted to drive cutting tool 14. The motors may be either directly or indirectly coupled to the cutting tool, and may also be adapted to drive workpiece transport mechanisms. Cutting tool 14 typically includes one or more blades or other suitable cutting implements that are adapted to cut or remove portions from the workpieces. The particular form of cutting tool 14 will vary depending upon the various embodiments of machine 10. For example, in table saws, miter saws, circular saws and radial arm saws, cutting tool 14 will typically include one or more circular rotating blades having a plurality of teeth disposed along the perimetrical edge of the blade. For a jointer or planer, the cutting tool typically includes a plurality of radially spaced-apart blades. For a band saw, the cutting tool includes an elongate, circuitous tooth-edged band.

Safety system 18 includes a detection subsystem 22, a reaction subsystem 24 and a control subsystem 26. Control subsystem 26 may be adapted to receive inputs from a variety of sources including detection subsystem 22, reaction subsystem 24, operative structure 12 and motor assembly 16. The control subsystem may also include one or more sensors adapted to monitor selected parameters of machine 10. In addition, control subsystem 26 typically includes one or more instruments operable by a user to control the machine. The control subsystem is configured to control machine 10 in response to the inputs it receives.

Detection subsystem 22 is configured to detect one or more dangerous, or triggering, conditions during use of machine 10. For example, the detection subsystem may be configured to detect that a portion of the user's body is dangerously close to, or in contact with, a portion of cutting tool 14. As another example, the detection subsystem may be configured to detect the rapid movement of a workpiece due to kickback by the cutting tool, as is described in U.S. Provisional Patent Application Ser. No. 60/182,866, the disclosure of which is herein incorporated by reference. In some embodiments, detection subsystem 22 may inform control subsystem 26 of the dangerous condition, which then activates reaction subsystem 24. In other embodiments, the detection subsystem may be adapted to activate the reaction subsystem directly.

Once activated in response to a dangerous condition, reaction subsystem 24 is configured to engage operative structure 12 quickly to prevent serious injury to the user. It will be appreciated that the particular action to be taken by reaction subsystem 24 will vary depending on the type of machine 10 and/or the dangerous condition that is detected. For example, reaction subsystem 24 may be configured to do one or more of the following: stop the movement of cutting tool 14, disconnect motor assembly 16 from power source 20, place a barrier between the cutting tool and the user, or retract the cutting tool from its operating position, etc. The reaction subsystem may be configured to take a combination of steps to protect the user from serious injury. Placement of a barrier between the cutting tool and teeth is described in more detail in U.S. Provisional Patent Application Ser. No. 60/225,206, entitled "Cutting Tool Safety System," filed Aug. 14, 2000 by SD3, LLC, the disclosure of which is herein incorporated by reference. Retraction of the cutting tool from its operating position is described in more detail in U.S. Provisional Patent Application Ser. No. 60/225,089, entitled "Retraction System For Use In Power Equipment," filed Aug. 14, 2000 by SD3, LLC, the disclosure of which is herein incorporated by reference.

The configuration of reaction subsystem 24 typically will vary depending on which action(s) are taken. In the exemplary embodiment depicted in FIG. 1, reaction subsystem 24 is configured to stop the movement of cutting tool 14 and includes a brake mechanism 28, a biasing mechanism 30, a restraining mechanism 32, and a release mechanism 34. Brake mechanism 28 is adapted to engage operative structure 12 under the urging of biasing mechanism 30. During normal operation of machine 10, restraining mechanism 32 holds the brake mechanism out of engagement with the operative structure. However, upon receipt of an activation signal by reaction subsystem 24, the brake mechanism is released from the restraining mechanism by release mechanism 34, whereupon, the brake mechanism quickly engages at least a portion of the operative structure to bring the cutting tool to a stop.

Figure 2:
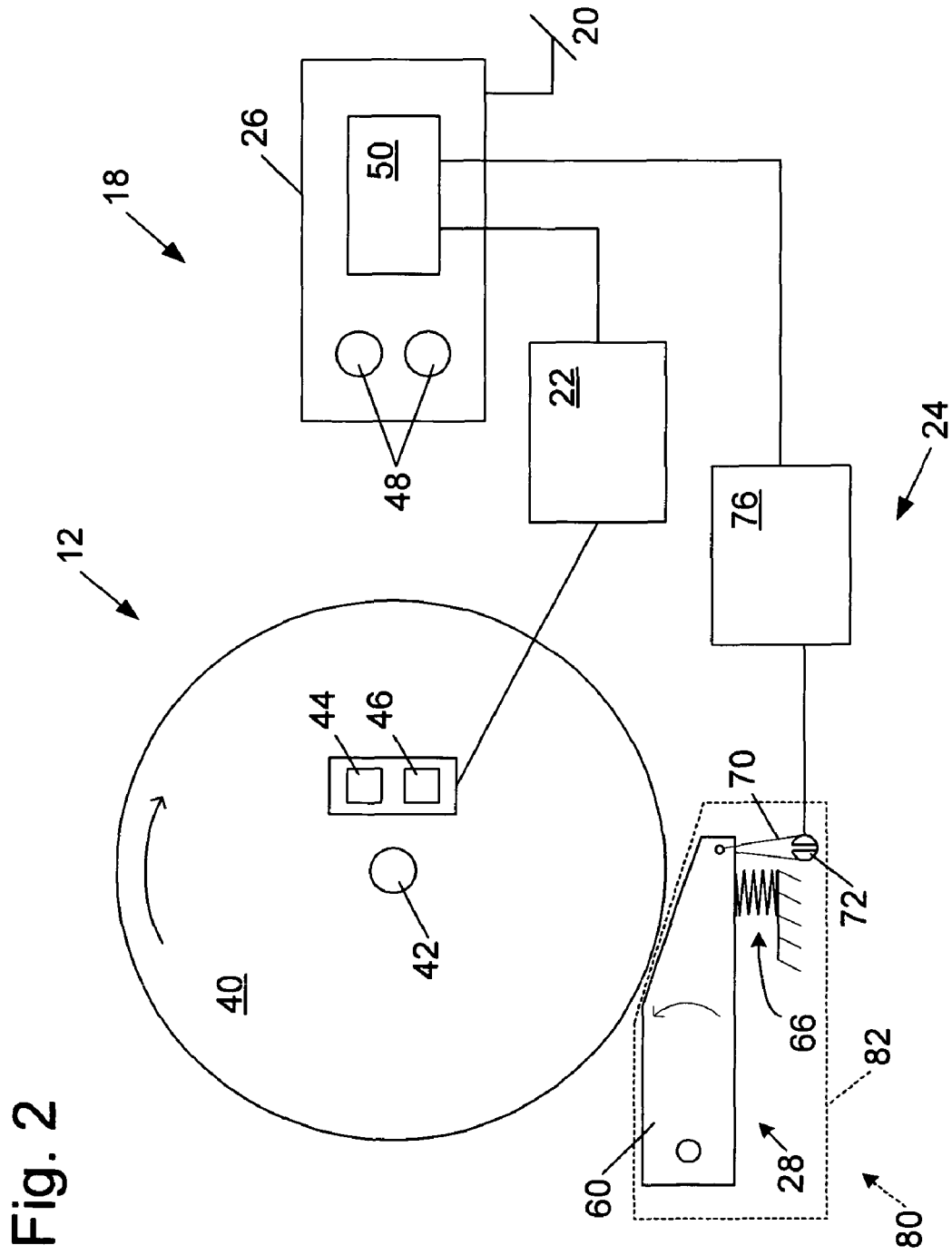
FIG. 2 is a schematic diagram of an exemplary safety system in the context of a machine having a circular blade.

It will be appreciated by those of skill in the art that the exemplary embodiment depicted in FIG. 1 and described above may be implemented in a variety of ways depending on the type and configuration of operative structure 12. Turning attention to FIG. 2, one example of the many possible implementations of safety system 18 is shown. System 18 is configured to engage an operative structure having a cutting tool in the form of a circular blade 40 mounted on a rotating shaft or arbor 42. Blade 40 includes a plurality of cutting teeth (not shown) disposed around the outer edge of the blade. As described in more detail below, braking mechanism 28 is adapted to engage the teeth of blade 40 and stop the rotation of the blade. U.S. Provisional Patent Application Ser. No. 60/225,210, entitled "Translation Stop For Use In Power Equipment," filed Aug. 14, 2000 by SD3, LLC, the disclosure of which is herein incorporated by reference, describes other systems for stopping the movement of the cutting tool. U.S. Provisional Patent Application Ser. No. 60/225,058, entitled "Table Saw With Improved Safety System," filed Aug. 14, 2000 by SD3, LLC, and U.S. Provisional Patent Application Ser. No. 60/225,057, entitled "Miter Saw With Improved Safety System," filed Aug. 14, 2000 by SD3, LLC, the disclosures of which are herein incorporated by reference, describe safety system 18 in the context of particular types of machines 10.

In the exemplary implementation, detection subsystem 22 is adapted to detect the dangerous condition of the user coming into contact with blade 40. The detection subsystem includes a sensor assembly, such as contact detection plates 44 and 46, capacitively coupled to blade 40 to detect any contact between the user's body and the blade. Typically, the blade, or some larger portion of cutting tool 14 is electrically isolated from the remainder of machine 10. Alternatively, detection subsystem 22 may include a different sensor assembly configured to detect contact in other ways, such as optically, resistively, etc. In any event, the detection subsystem is adapted to transmit a signal to control subsystem 26 when contact between the user and the blade is detected. Various exemplary embodiments and implementations of detection subsystem 22 are described in more detail in U.S. Provisional Patent Application Ser. No. 60/225,200, entitled "Contact Detection System For Power Equipment," filed Aug. 14, 2000 by SD3, LLC, and U.S. Provisional Patent Application Ser. No. 60/225,211, entitled "Apparatus And Method For Detecting Dangerous Conditions In Power Equipment," filed Aug. 14, 2000 by SD3, LLC, the disclosures of which are herein incorporated by reference.

Control subsystem 26 includes one or more instruments 48 that are operable by a user to control the motion of blade 40. Instruments 48 may include start/stop switches, speed controls, direction controls, etc. Control subsystem 26 also includes a logic controller 50 connected to receive the user's inputs via instruments 48. Logic controller 50 is also connected to receive a contact detection signal from detection subsystem 22. Further, the logic controller may be configured to receive inputs from other sources (not shown) such as blade motion sensors, workpiece sensors, etc. In any event, the logic controller is configured to control operative structure 12 in response to the user's inputs through instruments 48. However, upon receipt of a contact detection signal from detection subsystem 22, the logic controller overrides the control inputs from the user and activates reaction subsystem 24 to stop the motion of the blade. Various exemplary embodiments and implementations of logic controller 50 will be described below. Various exemplary embodiments and implementations of a blade motion detection system are described in U.S. Provisional Patent Application Ser. No. 60/225,094, entitled "Motion Detecting System For Use In Safety System For Power Equipment," filed Aug. 14, 2000 by SD3, LLC, the disclosure of which is herein incorporated by reference.

In the exemplary implementation, brake mechanism 28 includes a pawl 60 mounted adjacent the edge of blade 40 and selectively moveable to engage and grip the teeth of the blade. Pawl 60 may be constructed of any suitable material adapted to engage and stop the blade. As one example, the pawl may be constructed of a relatively high strength thermoplastic material such as polycarbonate, ultrahigh molecular weight polyethylene (UHMW) or Acrylonitrile Butadiene Styrene (ABS), etc., or a metal such as aluminum, etc. It will be appreciated that the construction of pawl 60 will vary depending on the configuration of blade 40. In any event, the pawl is urged into the blade by a biasing mechanism in the form of a spring 66. In the illustrative embodiment shown in FIG. 2, pawl 60 is pivoted into the teeth of blade 40. It should be understood that sliding or rotary movement of pawl 60 may also be used. The spring is adapted to urge pawl 60 into the teeth of the blade with sufficient force to grip the blade and quickly bring it to a stop.

The pawl is held away from the edge of the blade by a restraining mechanism in the form of a fusible member 70. The fusible member is constructed of a suitable material adapted to restrain the pawl against the bias of spring 66, and also adapted to melt under a determined electrical current density. Examples of suitable materials for fusible member 70 include NiChrome wire, stainless steel wire, etc. The fusible member is connected between the pawl and a contact mount 72. Preferably, fusible member 70 holds the pawl relatively close to the edge of the blade to reduce the distance the pawl must travel to engage the blade. Positioning the pawl relatively close to the edge of the blade reduces the time required for the pawl to engage and stop the blade. Typically, the pawl is held approximately $\frac{1}{32}$-inch to $\frac{1}{4}$-inch from the edge of the blade by fusible member 70, however other pawl-to-blade spacings may also be used within the scope of the invention.

Pawl 60 is released from its unactuated, or cocked, position to engage blade 40 by a release mechanism in the form of a firing subsystem 76. The firing subsystem is coupled to contact mount 72, and is configured to melt fusible member 70 by passing a surge of electrical current through the fusible member. Firing subsystem 76 is coupled to logic controller 50 and activated by a signal from the logic controller. When the logic controller receives a contact detection signal from detection subsystem 22, the logic controller sends an activation signal to firing subsystem 76, which melts fusible member 70, thereby releasing the pawl to stop the blade. Various exemplary embodiments and implementations of reaction subsystem 24 are described in more detail in U.S. Provisional Patent Application Ser. No. 60/225,056, entitled "Firing Subsystem For Use In Fast Acting Safety System," filed Aug. 14, 2000 by SD3, LLC, U.S. Provisional Patent Application Ser. No. 60/225,170, entitled "Spring-Biased Brake Mechanism for Power Equipment," filed Aug. 14, 2000 by SD3, LLC, and U.S. Provisional Patent Application Ser. No. 60/225,169, entitled "Brake Mechanism For Power Equipment," filed Aug. 14, 2000 by SD3, LLC, the disclosures of which are herein incorporated by reference.

It will be appreciated that activation of the brake mechanism will require the replacement of one or more portions of safety system 18. For example, pawl 60 and fusible member 70 typically must be replaced before the safety system is ready to be used again. Thus, it may be desirable to construct one or more portions of safety system 18 in a cartridge that can be easily replaced. For example, in the exemplary implementation depicted in FIG. 2, safety system 18 includes a replaceable cartridge 80 having a housing 82. Pawl 60, spring 66, fusible member 70 and contact mount 72 are all mounted within housing 82. Alternatively, other portions of safety system 18 may be mounted within the housing. In any event, after the reaction system has been activated, the safety system can be reset by replacing cartridge 80. The portions of safety system 18 not mounted within the cartridge may be replaced separately or reused as appropriate. Various exemplary embodiments and implementations of a safety system using a replaceable cartridge are described in more detail in U.S. Provisional Patent Application Ser. No. 60/225,201, entitled "Replaceable Brake Mechanism For Power Equipment," filed Aug. 14, 2000 by SD3, LLC, and U.S. Provisional Patent Application Ser. No. 60/225,212, entitled "Brake Positioning System," filed Aug. 14, 2000 by SD3, LLC, the disclosures of which are herein incorporated by reference.

While one particular implementation of safety system 18 has been described, it will be appreciated that many variations and modifications are possible within the scope of the invention. Many such variations and modifications are described in U.S. Provisional Patent Application Ser. Nos. 60/182,866 and 60/157,340, the disclosures of which are herein incorporated by reference.

Considering logic controller 50 now in more detail, it will be appreciated that the logic controller may be configured to perform a variety of functions depending on the particular type of machine 10 and/or the application. For example, logic controller 50 may be configured to conduct various self-test safety checks when the machine is switched on or off and during use, to ensure that detection subsystem 22 is operating properly and to prevent inadvertent triggering of reaction subsystem 24. Additionally, the logic controller may be configured to control one or more display devices to inform a user of the status of machine 10 and safety system 18. Furthermore, logic controller 50 may be implemented in a variety of ways including using one or more custom application specific integrated circuits (ASICs), microprocessors, micro-controllers, digital logic circuits, and/or analog circuits, etc.

In one exemplary embodiment, logic controller 50 is configured to perform the self-check logic sequence shown in FIG. 3. The exemplary sequence begins when the user initially supplies power to the system, indicated at 901. The logic system first checks to determine whether the spacing between the blade and pawl is correct, as indicated at 902. The blade-to-pawl spacing may be measured by any suitable mechanism such as described in more detail below. If the spacing is outside acceptable limits, the system responds with an error signal, indicated at 903. The error signal may be an audible and/or visible signal, etc. In one embodiment described in more detail below, control subsystem includes a user interface adapted to indicate the status of the machine and annunciate any error conditions. Preferably, the logic system remains in the error state and prevents further operation of the machine until the correct blade-to-pawl spacing is detected.

If the blade-to-pawl spacing is acceptable, the logic system determines whether the input signal produced on charge plate 44 by detection subsystem 22 is being detected at a sufficient amplitude on charge plate 46, as indicated at 904. This step ensures that the reaction subsystem will not be triggered accidentally upon start-up due to a fault in the detection subsystem, a grounded blade, incorrectly placed charge plates, etc. If the proper input signal is not detected, logic controller 50 responds with an error signal 903. It will be appreciated that either the same or a different error signal may be produced for each fault condition.

If the proper input signal is detected, the logic controller proceeds to determine whether a fusible member is present, as indicated at step 905. The presence of a fusible member may be determined by any suitable means such as described in more detail below. If no fusible member is present, logic controller 50 returns an error signal 903. If a fusible member is detected, the logic controller then checks the electrical charge stored by firing subsystem 76, as indicated at 906. This step ensures that sufficient charge is present to melt the fusible member if the dangerous condition is detected. Exemplary circuitry for detecting sufficient charge is described in more detail below. If sufficient charge is not detected within a determined time period, the logic controller responds with an error signal 903.

In the sequence depicted in FIG. 3, after the predetermined checks are completed, logic controller 50 allows power to be sent to motor assembly 16, as indicated at 907. It will be appreciated that the electrical sequence described above typically is completed within no more than a few seconds if no faults are detected. In addition to an initial power-up sequence, logic controller 50 may be configured to perform any of a variety of checks during operation. For example, the rotation of the blade may be monitored by known mechanisms and the firing system may be disabled when the blade is not moving. This would allow the user to touch the blade when it is stopped without engaging brake mechanism 28. Various exemplary embodiments and implementations of a blade motion detection system are described in U.S. Provisional Application Ser. No. 60/225,094, entitled "Motion Detection System for Use in Safety System for Power Equipment," filed Aug. 14, 2000, by SD3, LLC.

It will appreciated that many variations on the logic sequence described above may be implemented within the scope of the invention. For example, some embodiments of logic controller 50 may include a battery, a capacitor or other charge storage device to ensure the detection and reaction subsystems will continue to function at least temporarily after power to the machine is turned off. As another example, power to the motor assembly may be shut off if an error occurs other than contact detection such as incorrect blade-to-charge plate spacing, insufficient charge on the charge storage devices, etc. Thus, logic controller 50 may be implemented to provide any of a variety of safety and/or operational functions as desired.

Additionally, since reaction subsystem 24 is configured to stop cutting tool 14 upon contact with a user's body, it may also be desirable to stop motor assembly 16, or at least the portion of the motor assembly adapted to drive the cutting tool, to prevent damage to the motor as it tries to drive the stalled cutting tool. However, since machine 10 typically is designed with the expectation that the cutting tool may stop due to binding, etc., it will usually be sufficient to turn off the motor assembly within a few seconds. This can be accomplished simply by cutting power to the motor. For example, when machine 10 includes a magnetic contactor switch 48, the logic controller may be adapted to interrupt the circuit holding the magnetic contactor closed so that power to the motor is interrupted. It should be understood that this step is optional, in that interrupting power to the machine's motor assembly is neither necessary nor sufficient to prevent serious injury to the user when the user touches the machine's cutting tool. Therefore, the principal benefit of this step is to reduce the likelihood of damaging the motor assembly or drive system while the brake system is preventing rotation or other movement of the cutting tool. It will be appreciated that there are many other suitable ways of stopping motor assembly 12 which are within the scope of the invention. As one example, power to the motor assembly may be controlled directly by safety stop 30 (e.g., through solid state on/off switches, etc.). This embodiment is described in more detail in U.S. Provisional Application Ser. No. 60/225,200, entitled "Contact Detection System for Power Equipment," filed Aug. 14, 2000, by SD3, LLC. Also, it is possible to simply allow existing overload circuitry to trip in and turn off the stalled motor.

Since the contact detection subsystem described above relies on certain electrical properties of the human body, the use of safety system 18 while cutting some materials, such as foil-coated insulation, may cause the detection circuitry to falsely register contact with a user. In addition, as described in U.S. Provisional Application Ser. No. 60/225,200, entitled "Contact Detection System for Power Equipment," filed Aug. 14, 2000, by SD3, LLC, extremely green wood may cause false triggers in some types of detection subsystems due to the relatively high dielectric constant of green wood. Therefore, it may be desirable to provide a manual bypass or override control that prevents the brake from operating for a particular cutting operation. A suitable override control may include a mechanical switch between fusible member 70 and firing system 76. Alternatively, the switch may be a single-use switch configured to reset itself after each use. As a further alternative, safety system 18 may include sensors adjacent the workpiece to detect the presence of foil, green wood, etc., and disable the reaction subsystem automatically. This latter alternative relieves the user of having to remember to disable and re-enable the brake system.

In any event, the override control may be configured in a variety of ways depending on the application and the level of safety desired. For example, the override control may be configured to time-out (i.e., turn off) if the user does not switch the machine on within a predetermined time (e.g., 3, 5 or 10 seconds, etc.). This would prevent the user from actuating the override control and then becoming distracted before proceeding to cut the workpiece and forgetting the safety system had been disabled. In some embodiments, it may be desirable to allow a user to override the error caused by a failed self-test (e.g., no fusible member, insufficient stored charged, missing or incorrectly installed cartridge 80, etc.). In other embodiments, logic controller 50 may be configured to require that the detection and reaction subsystems are operational before allowing the user to engage the override.

Typically, the override control is configured to reduce the likelihood that it will be actuated accidentally by the user. For example, the override control switch may be located away from the remaining operator switches and away from an area on machine 10 where the user is likely to accidentally bump against while using the machine. Alternatively or additionally, override control switch 48 may include a cover or similar barrier which the user must remove or overcome before the switch can be actuated. Such covered switches are known to those of skill in the art. As an additional safety measure, logic controller 50 may be configured to produce a visual and/or audible alarm or warning when the override is actuated. Furthermore, where logic controller 50 is adapted to control the supply of power to motor assembly 16, the logic controller may be configured to "pulse" the motor one or more times to alert the user that the blade is about to begin moving with the safety system disabled. This would alert a user, who accidentally actuated the override while in contact with the blade, to quickly move away from the blade.

Figure 4B:
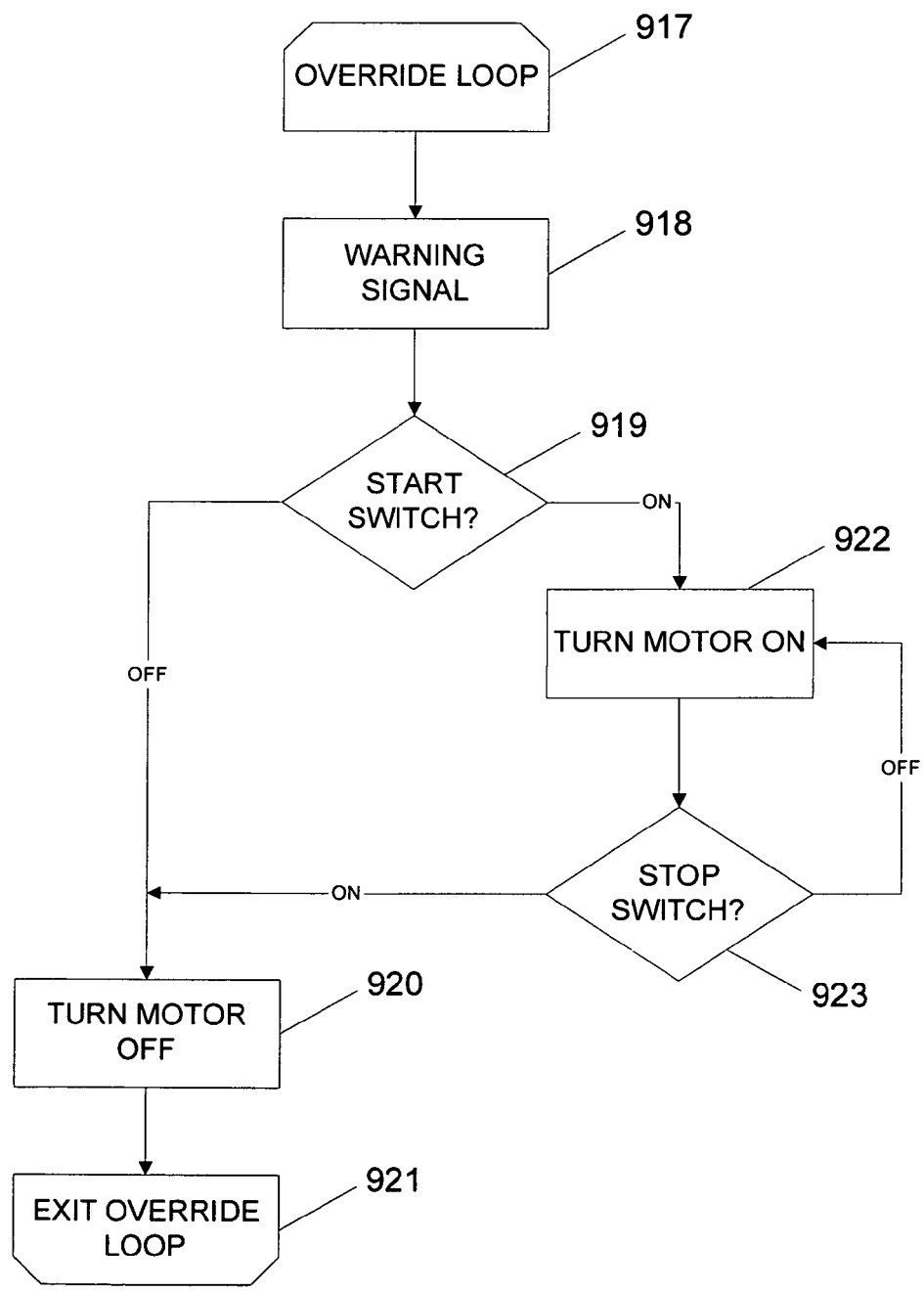
Figure 4C:
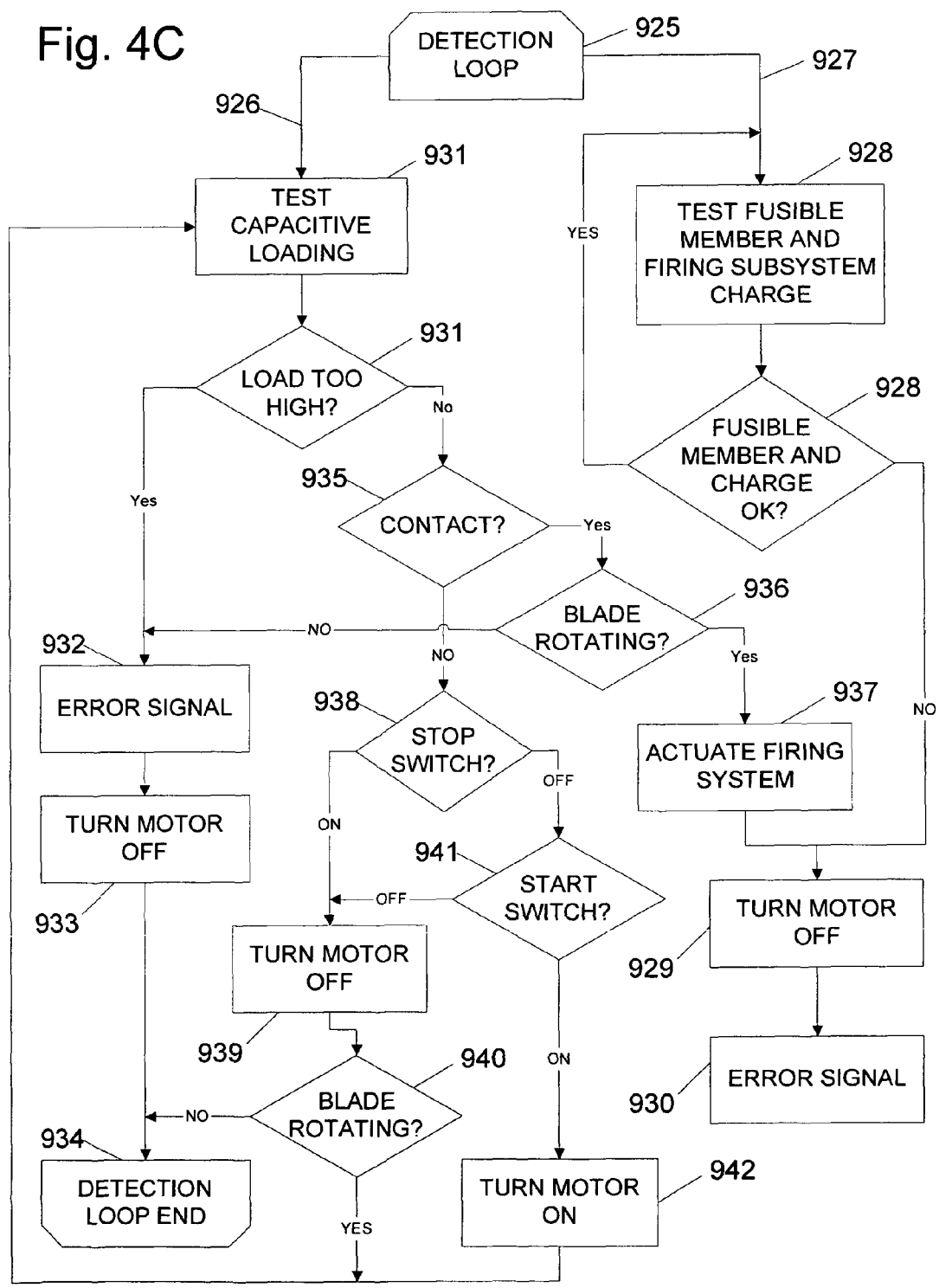

In view of the above considerations, an alternative embodiment of logic controller 50 may be configured to perform the self-test and detection logic shown schematically in FIGS. 4A-C. The main logic sequence, indicated generally at 910 in FIG. 4A, begins when machine 10 is first connected to power source 20, as indicated at 911. Logic controller 50 begins sequence 910 by performing a system integrity check, as indicated at 912. The system integrity check may include any one or more of a variety of checks which typically will vary depending on the particular type and configuration of machine 10. In the exemplary embodiment, system integrity check 912 includes testing the sufficiency of power source 20 (here, standard line current) by any suitable means which are known to those of skill in the art. The system integrity check may also include driving the detection signal onto charge plate 44 and attempting to detect the signal at charge plate 46. Failure to detect the detection signal at charge plate 46 may indicate a number of problems such as an electronic failure in detection subsystem 22, a mis-positioned or grounded charge plate, grounded blade, etc. Exemplary system integrity check 912 also includes a pawl-to-blade spacing test to ensure that pawl 60 is properly positioned adjacent blade 40 so that the pawl will engage and stop the blade if released. Exemplary mechanisms for detecting correct blade-to-pawl spacing are described in more detail below. If any of the tests performed during system integrity check 912 is negative, logic controller 50 turns motor assembly 16 off (if on), as indicated at 913, and outputs an error signal to the user, as indicated at 914. Once the user corrects the error and resets the logic controller (e.g., by disconnecting and then reconnecting the power to machine 10), the system integrity check is repeated.

If system integrity check 912 is successful, logic controller 50 proceeds to check fusible member 70 as well as the stored charge in firing subsystem 76, as indicated at 915. If either the fusible member test or the stored charge test is negative, the logic controller turns off the motor assembly, indicated at 913, and then outputs an error signal, indicated at 914. It may be desirable to repeat step 915 one or more times, or provide a delay between steps 912 and 915 to ensure that firing subsystem 76 has sufficient time to build up the electrical charge.

If both the fusible member and firing subsystem tests are successful, the logic controller then proceeds to one of two operational loops depending on whether the user-operable override switch has been activated, as indicated at 916. It will be appreciated that testing for a user override signal after performing the fusible member/charge storage test prevents a user from overriding safety system 18 unless the safety system is functional. Thus, for example, if a contact detection occurs and the brake is triggered, the user cannot proceed to operate the system until the fusible member, and/or pawl, and/or firing subsystem, etc., is replaced (typically by replacing cartridge 80). Alternatively, step 915 may be eliminated from the main operational loop. This would allow machine 10 to be operated regardless of whether safety system 18 was completely functional by engaging the override.

In any event, if the override has been actuated, logic controller 50 proceeds to operate in an override loop, as indicated at 917 and detailed in FIG. 4B. Typically, logic controller 50 first outputs a warning signal, as indicated at 918 and described above. Next, at step 919, the logic controller checks the status of START switch 48, which is operable by a user to turn on motor assembly 16. As described above, logic controller 50 may be configured to read START switch 48 as being "on" only if it is actuated within a predetermined period after the override is enabled. If the START switch is "off," logic controller 50 turns off the motor assembly (if on), as indicated at 920, and exits the override loop as indicated at 921. As shown in FIG. 4A, the logic controller returns to the system integrity check at the end of the override loop. Thus, the logic controller will continue to perform the system integrity check and the fusible member/stored charge tests until the START switch is actuated. This ensures that if a user engages the override and then delays actuating the START switch, the system will not turn on the motor assembly if a failure occurs between the time the override is enabled and the time the START switch is actuated.

If, at step 919, the START switch is on, logic controller proceeds to turn on motor assembly 16, as indicated at 922. The motor assembly remains on until STOP switch 48 is actuated by the user, as indicated at 923. Once the STOP switch is actuated, logic controller 50 turns off the motor assembly, as indicated at 920, and exits the override loop at 921. As mentioned above, the logic controller returns to step 912 after exiting the override loop.

If, at step 916, the override has not been engaged by the user, logic controller 50 proceeds to the detection loop 925, which is shown in detail in FIG. 4C. In the exemplary embodiment, detection loop 925 is depicted with two logic paths which are executed simultaneously. In a first path 926 the logic controller monitors detection subsystem 22, while in a second path 927 the logic controller continually rechecks the fusible member and stored charge in firing subsystem 76. This dual-path operation ensures that machine 10 will be shut down if a failure occurs while the blade is in motion. It will be appreciated by those of skill in the art that the dual-path operation may be implemented in a variety of ways including the use of interrupts, state machines, etc. Alternatively, the two paths may be implemented in a single sequential loop. However, since testing of the stored charge consumes several milliseconds or even several seconds in some embodiments, it is typically desirable, in those embodiments, to execute both paths simultaneously so that several milliseconds or more do not pass between successive contact detection measurements.

Path 927 includes testing fusible member 70 and the charge stored by firing subsystem 76, as indicated at 928. This test is continuously repeated unless and until either the fusible member test or the stored charge test fails, at which point logic controller 50 turns the motor assembly off, as indicated at 929, and outputs an error message, as indicated at 930. The logic controller also stops executing test 928 when it exits the detection loop or when an error in path 926 occurs, as described below. The tests of fusible member 70 and firing subsystem 76 at step 928 may be the same as, or different than, the tests that are used in the main loop at step 915. In any event, the logic controller must be reset from step 930, as described above.

Path 926 is the contact detection path and includes testing for excessive impedance loading on the blade, as indicated at 931. Step 931 ensures that power will not be supplied to the motor assembly if the capacitive load on the blade is so high that the detection subsystem might not be able to detect a contact between the blade and the user. This might occur for a variety of reasons. For example, if the blade is cutting highly dielectric materials (e.g., green wood), the capacitive load on the blade will increase. This issue is described in more detail in the incorporated references.

As another example, the user might accidentally actuate the START switch while in contact with the blade. Since some exemplary detection subsystems rely on a sudden change (rather than an absolute level) in the signal detected at charge plate 46, step 931 ensures that the safety system will not allow the blade to begin rotating if the user is touching the blade when the START switch is actuated. In this embodiment, the logic controller is configured to set the value for excessive capacitive loading at approximately at least that amount of loading caused when a user contacts the blade. However, it will be appreciated that logic controller 50 may be configured to recognize any desired amount of capacitive loading as being excessive.

If the capacitive load on the blade is too high, logic controller 50 outputs an error signal, at 932, and turns off motor assembly 16 (if on), as indicated at step 933. The logic controller then exits the detection loop, at 934, and returns to system integrity check 912 in the main operational loop shown in FIG. 4A. It will be appreciated that safety system 18 will not be enabled during the several seconds it takes the blade to spin down. This is because the capacitive loading is too high to accurately detect contact with the user, and is likely to trigger even though no contact has occurred. In alternative embodiments, the logic controller may continue to monitor for contact detection while the blade is rotating and actuate the firing system if contact is detected. Alternatively, the logic controller may be configured to actuate the firing system if the loading becomes too high.

Once the logic controller returns to the main loop after detecting a high capacitive loading error, the user may nevertheless operate machine 10 by engaging the override. If the user does not actuate the override, safety system 18 will not supply power to motor assembly 16 until the capacitive loading problem is corrected.

If, at step 931, the capacitive loading on the blade is within defined limits, the logic controller proceeds to test the contact detection signal from detection subsystem 22, as indicated at 935. If contact is detected, the logic controller determines whether the blade is rotating, as indicated at 936. If the blade is rotating, the logic controller actuates the firing subsystem, at 937, turns off motor assembly 16, at 929, and outputs an error, at 930. The logic controller must then be reset as described above.

However, if the blade is not rotating at step 936, then the logic controller outputs an error signal, at step 932, turns off the motor assembly (if on), at 933, and exits the detection loop, at 934. Thus, if a user touches the blade when it is not rotating, the safety system will detect the contact but will not actuate the firing subsystem. This allows a user to change or adjust the blade without actuating the brake. However, the user would typically remove power from machine 10 before adjusting or replacing the blade, in which case, neither safety system 18 nor motor assembly 16 would be operable.

If no contact is detected at step 935, logic controller 50 checks the status of STOP switch 48, as indicated at 938. If the STOP switch is actuated, the logic controller turns off the motor assembly (if on), as indicated at 939, and checks for blade rotation, as indicated at 940. If the blade is rotating, the logic controller loops back to step 931 so that the contact detection is active as long as the blade continues to rotate. Thus, if a user actuates the STOP switch and then contacts the blade before it spins down, safety system 18 will react to stop the blade. Once the blade ceases to rotate, the logic controller exits the detection loop, as indicated at 934.

If the STOP switch has not been actuated at step 938, the logic controller checks the status of START switch 48, as indicated at 941. If the START switch has been actuated, the logic controller turns the motor assembly on (if off), and loops back to repeat the contact detection, as indicated at 942. If the START switch has not been actuated, the logic controller turns off the motor assembly (if on), as indicated at 939, and checks for blade rotation, at 940. The logic controller continues to execute the detection loop until the blade stops, at which point the logic controller exits the detection loop, as indicated at 934. Thus, the logic controller is configured to continuously monitor for contact detection whenever the blade is rotating and the user has not engaged the override.

Those of skill in the art will appreciate that control subsystem 26 and logic controller 50 may be implemented using many different components and many different configurations. Therefore, while two exemplary implementations are described below, it should be understood that any other suitable implementation may be used.

Figure 5:
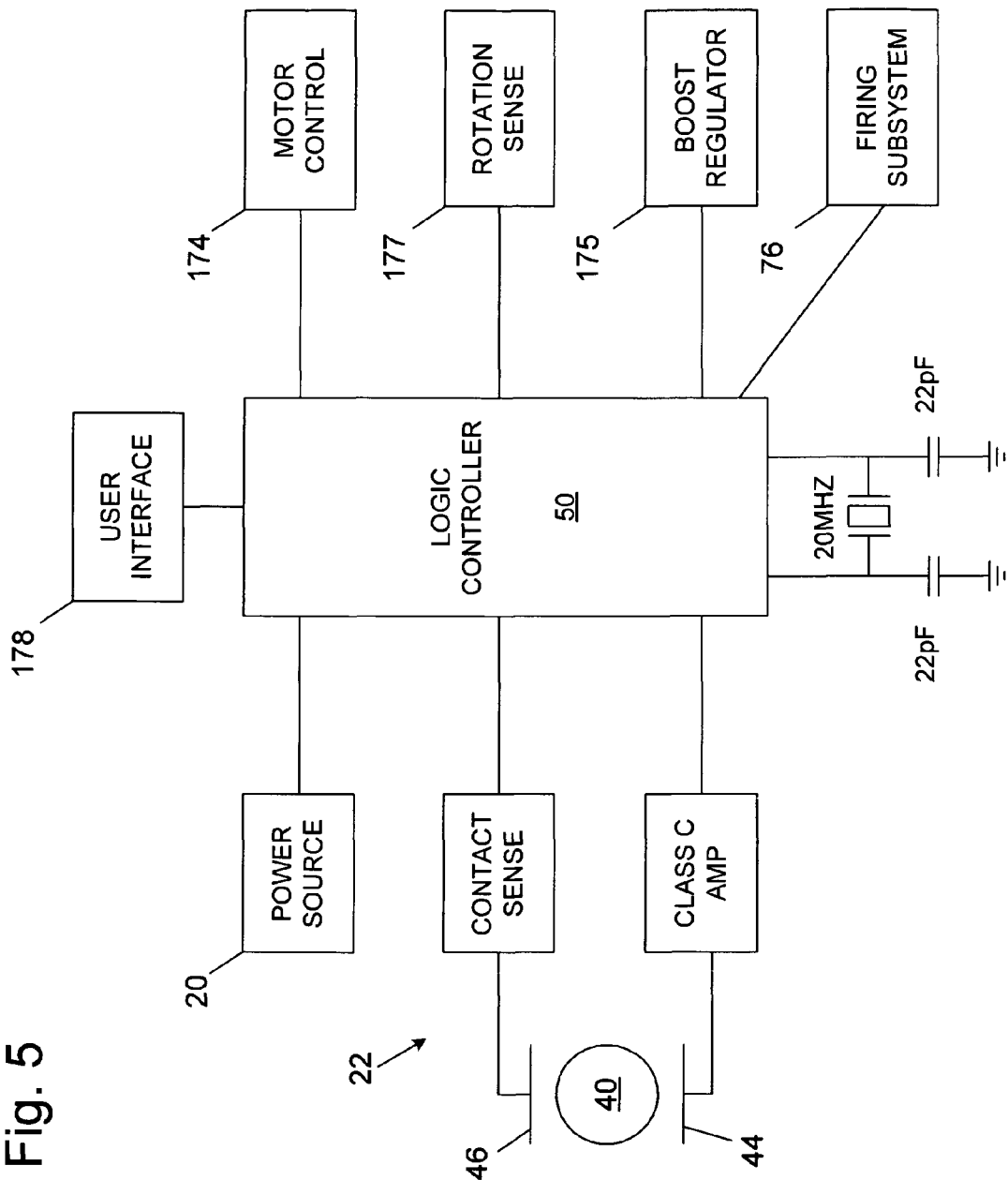
FIG. 5 is a schematic block diagram of a logic controller according to a first exemplary implementation of the present invention.
Figure 6:
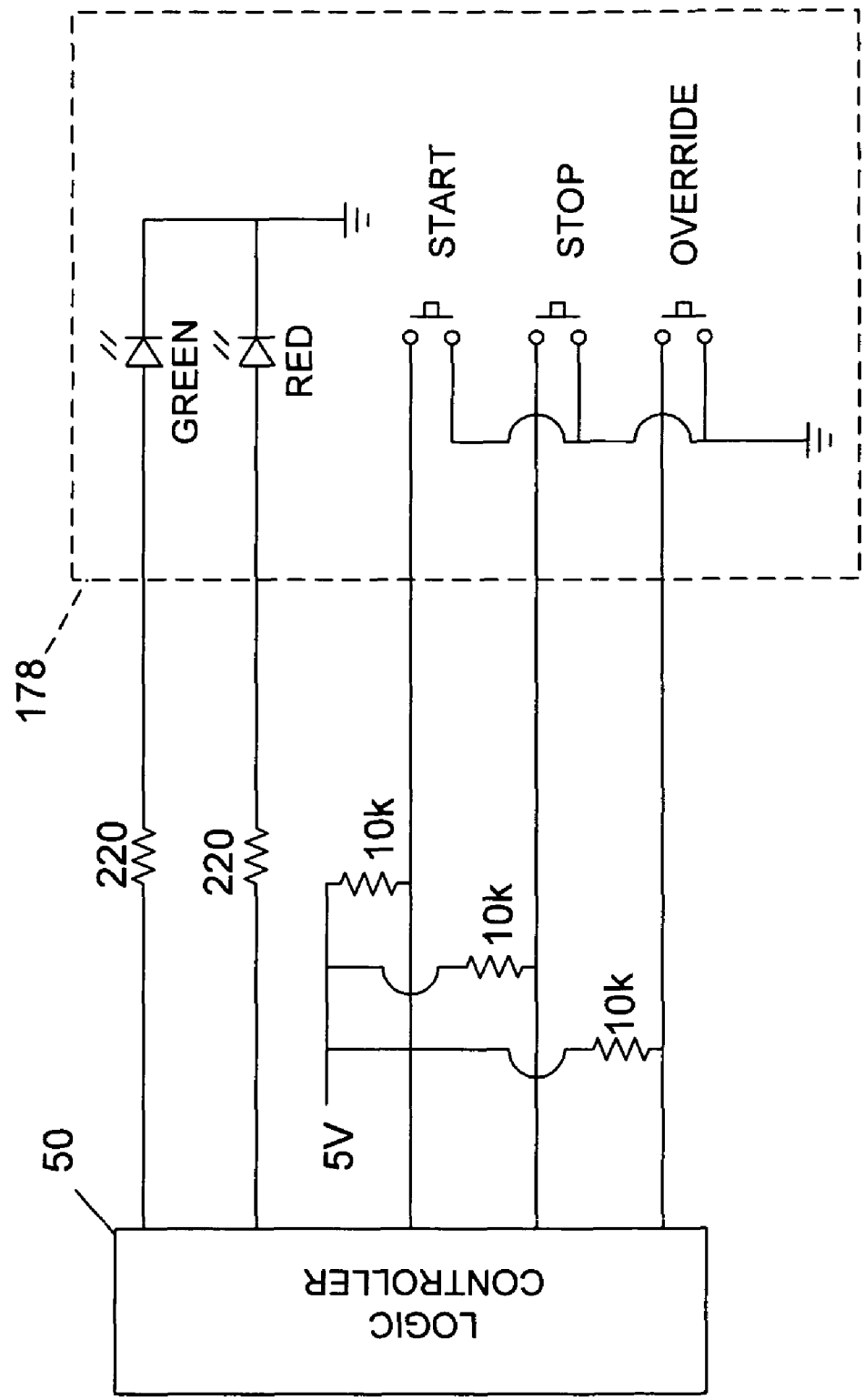
FIG. 6 is a schematic diagram of a user interface according to the present invention.

A first exemplary implementation is illustrated schematically in FIG. 5. Logic controller 50 takes the form of a PIC16C63A-20/SO controller available from Microchip Technology, Inc., of Chandler, Ariz. The logic controller is coupled to power source 20, contact detection subsystem 22, and a user interface 178. The user interface may include any suitable mechanism adapted to display signals to a user and to allow a user to input signals to the logic controller. Examples of suitable user interface mechanisms which are known to those of skill in the art include lights, display screens, buzzers, sirens, switches, buttons, knobs, etc. In one exemplary embodiment depicted in FIG. 6, user interface 178 includes START, STOP, and OVERRIDE switches to allow the user to input control commands, and a pair of LED lights which indicate the system status. The LED lights may indicate system status in a variety of ways such as color, blinking, etc.

The logic controller is also connected to control motor assembly 16 via a suitable motor control circuit 174, such as is described in more detail in U.S. Provisional Application Ser. No. 60/225,200, entitled "Contact Detection System for Power Equipment," filed Aug. 14, 2000, by SD3, LLC, and to firing subsystem 76. When the logic controller receives a signal from detection subsystem 22 that contact between the user and blade has occurred, the logic controller actuates firing subsystem 76 and stops motor assembly 16. The operation and testing sequences are implemented by software instructions stored within, and executable by, the logic controller. It will be appreciated that the software instructions may take a variety of forms.

The logic controller of the exemplary implementation depicted in FIG. 5 is configured to conduct a variety of self-tests before enabling power to motor control 174, as well as whenever the blade is moving. For example, the logic controller is configured to evaluate the line voltage supplied by power source 20, and to shut off the motor if the voltage drops below a minimum value sufficient to operate the safety system. The logic controller is also adapted to test the contact sense signal received from the detection subsystem to ensure the charge plates are correctly positioned, that the detection signal is properly coupled across the blade, and that the capacitive load on the blade is within defined limits. Further, the logic controller is also coupled to a blade rotation sense component 177. Examples of suitable mechanisms for detecting blade rotation are described in U.S. Provisional Application Ser. No. 60/225,094, entitled "Motion Detection System for Use in Safety System for Power Equipment," filed Aug. 14, 2000, by SD3, LLC.

In addition, logic controller 50 is also adapted to detect whether firing subsystem 76 has sufficient stored charge to melt fusible member 70. It will be appreciated that detection of sufficient stored charge in the firing subsystem may be carried out in a variety of ways depending on the configuration of the firing system. In each of the exemplary implementations described herein, firing subsystem 76 includes a single 390 µF firing capacitor 620 configured to discharge through fusible member 70 via a suitable SCR 621 connected to ground. Exemplary firing subsystems 76 are described in greater detail in U.S. Provisional Application Ser. No. 60/225, 056, entitled "Firing Subsystem for Use in a Fast-Acting Safety System," filed Aug. 14, 2000, by SD3, LLC.

Figure 7:
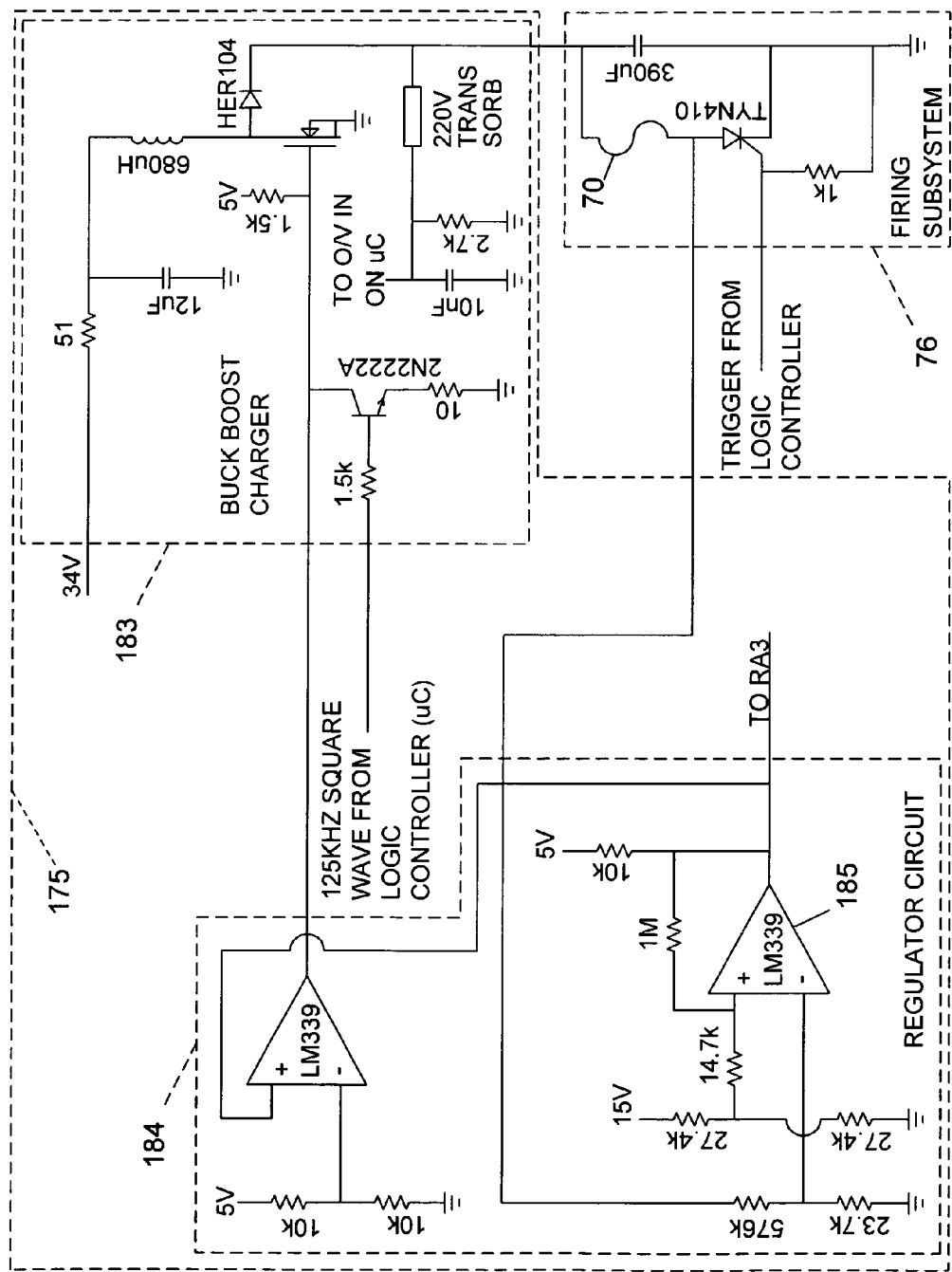
FIG. 7 is a schematic diagram of a firing capacitor charge and test circuit according to the first exemplary implementation of the present invention.

In the implementation depicted in FIG. 5, the firing capacitor is both charged and tested by a buck-boost regulator 175, which is shown in greater detail in FIG. 7. Buck-boost regulator 175 includes a buck-boost charger 183 that steps up an 32-volt supply input to 180 volts for charging the firing capacitor. Logic controller 50 provides a 125 khz input to control the buck-boost cycle of the charger. A regulator circuit 184 monitors the voltage on the firing capacitor and turns charger 183 on or off as necessary to maintain the charge near 180 volts. Regulator circuit 184 is constructed with a predetermined amount of hysteresis so that the charger will go on when the firing circuit voltage falls below 175 volts and turn off when the voltage reaches 180 volts, as set by the voltage divider inputs and feedback to comparator 185.

The output of comparator 185 is fed to logic controller 50. The logic controller monitors both the time required to charge and to discharge the firing capacitor based on the state of the output of comparator 185. Thus, the controller can verify that the firing capacitor is operating properly and storing adequate charge. If the firing capacitor cannot reach 180 volts quickly enough or discharges too rapidly, the logic controller determines that the firing capacitor or charging system has failed and takes appropriate action based on its programming.

It should be noted that regulator circuit 184 measures the voltage across the firing capacitor through fusible member 70. As a result, the regulator circuit is also testing the integrity of the fusible member since a missing or failed fusible member would prevent the regulator circuit from detecting the voltage on the firing capacitor. While testing both the firing capacitor charge and fusible member with a single mechanism or test provides obvious savings of both processor cycle time and component costs, the fusible member may alternatively be tested separately from the firing capacitor charge.

Figure 8:
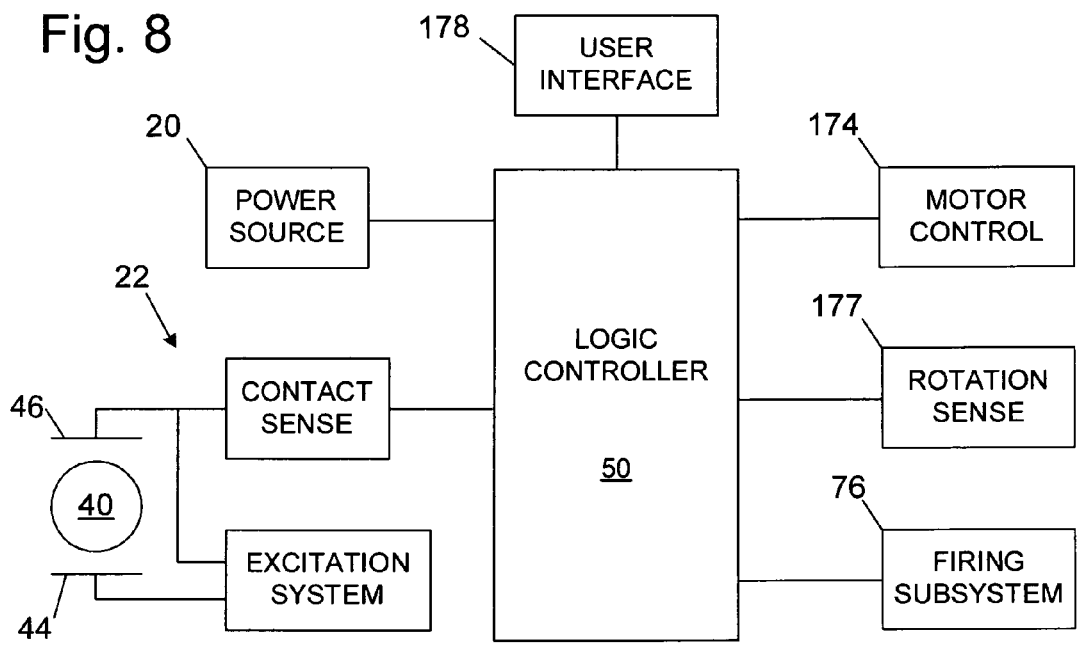
FIG. 8 is a schematic block diagram of a logic controller according to a second exemplary implementation of the present invention.

A second exemplary implementation of logic controller 50 is illustrated schematically in FIG. 8. Logic controller 50 is implemented by a 87C752 controller available from Philips Semiconductor of Sunnyvale, Calif. As in the first exemplary implementation described above, the logic controller of the second implementation is coupled to power source 20, contact detection subsystem 22, firing subsystem 76, user interface 178, motor control 174, and blade rotation sense 177. Suitable examples of power source 20, contact detection subsystem 22, and motor control 174 are described in more detail in U.S. Provisional Application Ser. No. 60/225,200, entitled "Contact Detection System for Power Equipment," filed Aug. 14, 2000, by SD3, LLC. Exemplary firing subsystems 76 are described in more detail in U.S. Provisional Application Ser. No. 60/225,056, entitled "Firing Subsystem for Use in a Fast-Acting Safety System," filed Aug. 14, 2000, by SD3, LLC. Exemplary circuitry and mechanisms for sensing blade rotations are described in more detail in U.S. Provisional Application Ser. No. 60/225,094, entitled "Motion Detection System for Use in Safety System for Power Equipment," filed Aug. 14, 2000, by SD3, LLC.

Figure 9:
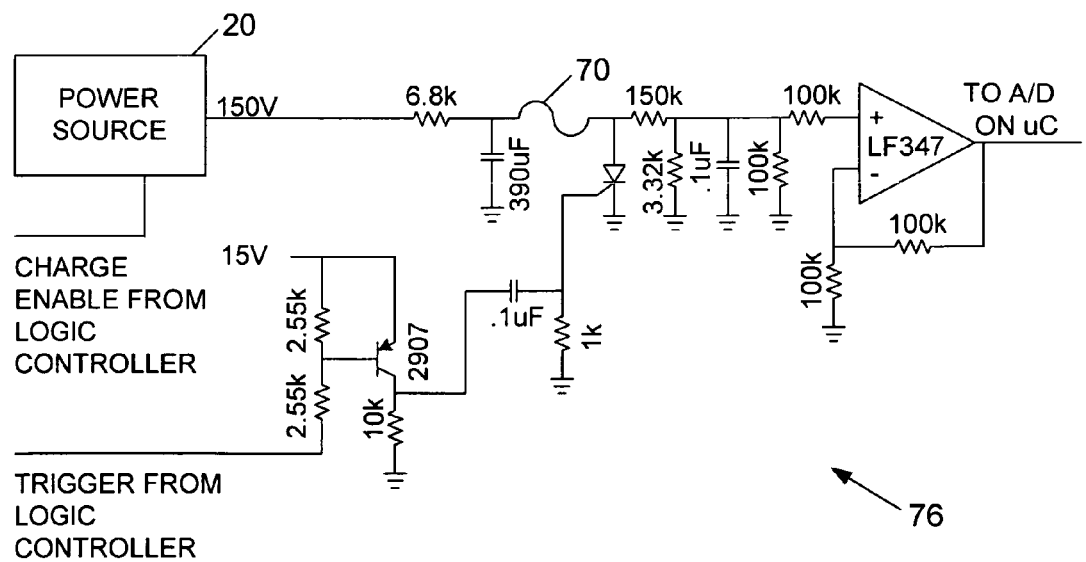
FIG. 9 is a schematic diagram of a firing capacitor charge and test circuit according to the second exemplary implementation of the present invention.

As shown in FIG. 9, the firing capacitor charging circuit for the second implementation is regulated by an enable line from logic controller 50. By deactivating the charging circuit, the logic controller can monitor the capacitor voltage through an output to an analog-to-digital converter (A/D) line on the logic controller. When the capacitor is not being charged, it will normally discharge at a relatively known rate through the various paths to ground. By monitoring the discharge rate, the controller can insure that the capacitance of the capacitor is sufficient to burn the fusible member. Optionally, the logic controller may be configured to measure the voltage on the firing capacitor at a plurality of discharge intervals to evaluate the integrity of the capacitor. In one embodiment, the logic controller measures the capacitor voltage at three defined intervals during a discharge cycle, which should correspond to 3%, 5% and 7% of the full charge voltage. The logic controller may be configured to interpret a low voltage at any of the discharge intervals as a failure, or may require a low voltage at two or more discharge intervals to indicate a failure.

As with the first exemplary implementation described above, the logic controller is configured to test the firing capacitor through fusible member 70, thereby simultaneously testing the fusible member. Alternatively or additionally, the logic controller may test the fusible member independently of the capacitor by monitoring the capacitor voltage during charging.

As mentioned above, logic controller 50 may also be configured to monitor the pawl-to-blade spacing. It is well known in the art that many cutting tools such as saw blades do not have precisely uniform dimensions. As a result, when a new blade is installed on a saw, the pawl may no longer be correctly spaced from the blade. An incorrectly positioned pawl may slow the stopping speed of the pawl or prevent the pawl from stopping the blade. Therefore, to ensure the blade is stopped with uniform braking speed, it may be necessary to adjust the position of the pawl whenever a blade is replaced. Exemplary mechanisms and methods for automatically positioning the pawl are described in U.S. Provisional Application Ser. No. 60/225,212 entitled "Brake Positioning System," filed Aug. 14, 2000, by SD3, LLC. However, regardless of whether the pawl is automatically positioned, configuring logic controller 50 to detect incorrect blade-to-pawl spacing provides an additional level of assurance that a user is protected against accidental contact with the blade.

Figure 10:
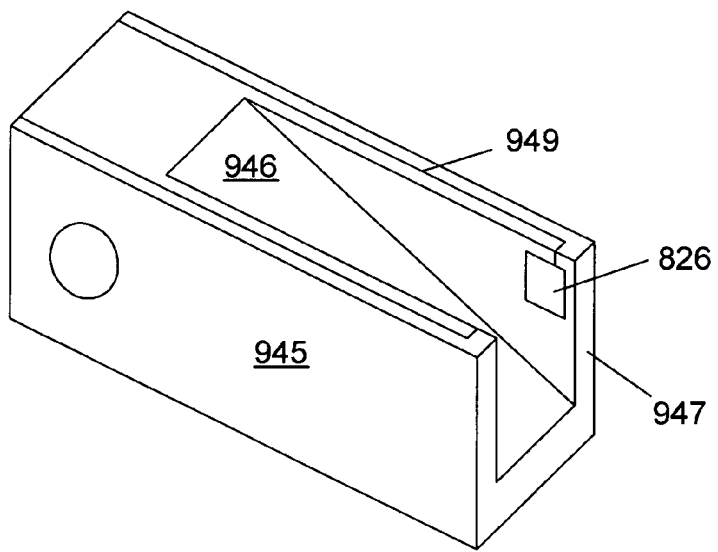
FIG. 10 is an isometric view of an exemplary pawl adapted for measuring pawl-to-blade spacing according to the present invention.

It will be appreciated that there are many ways in which incorrect spacing between blade 40 and pawl 60 may be detected. As one example, FIG. 10 illustrates a pawl 945 having a capacitive system for detecting correct pawl spacing. Similar to pawl 40 shown in FIG. 2, pawl 945 may include a portion 946 that is beveled or otherwise shaped to quickly and completely engage the teeth of a cutting tool. In addition, pawl 945 includes a pair of generally parallel, spaced-apart arms 947 which extend beyond portion 946. Arms 947 are disposed to extend on either side of the blade, without touching the blade, when the pawl is in place adjacent the blade. Each arm includes a capacitor plate 826 disposed on the inside surface of the arm adjacent the blade. Conductive leads 949 run from each capacitor plate 826 to suitable blade detector circuitry (not shown).

Capacitor plates 826 are positioned on arms 947 such that, when the pawl spacing is within a desired range, the blade extends between the two capacitor plates. It will be appreciated that the capacitance across plates 826 will vary depending on whether the blade is positioned between the plates. The blade detector circuitry is configured to drive an electrical signal through conductive leads 949 and detect changes in the capacitance across the plates.

Figure 11:
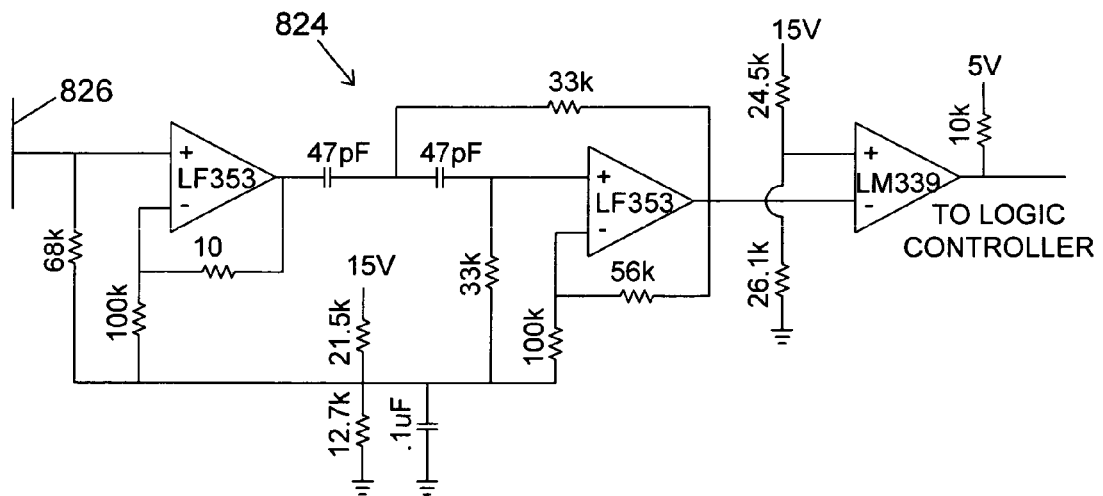
FIG. 11 is a schematic diagram of an exemplary circuit for detecting blade-to-pawl spacing according to the present invention.

Suitable circuitry that may be used with pawl 945 is well known to those of skill in the art. One exemplary pawl-to-blade spacing detection circuit is indicated generally at 824 in FIG. 11. As described above and in U.S. Provisional Application Ser. No. 60/225,200, entitled "Contact Detection System for Power Equipment," filed Aug. 14, 2000, by SD3, LLC, and U.S. Provisional Application Ser. No. 60/225,211, entitled "Apparatus and Method for Detecting Dangerous Conditions in Power Equipment," filed Aug. 14, 2000, by SD3, LLC, one exemplary contact detection system suitable for use with the present invention applies an electrical signal to the blade via a drive plate (not shown). This signal can be picked up by either or both of plates 826 and monitored to insure that it has an amplitude in a predetermined range. In particular, the amplitude detected by plates 826 will fall off rapidly with distance from the blade. Therefore, by monitoring the detected amplitude, proper spacing can be verified. If the proper signal is not detected, circuit 824 conveys an error signal to logic controller 50, which prevents operation of machine 10 until proper pawl-to-blade spacing is detected. Other examples include circuits similar to the exemplary contact detection circuits described in U.S. Provisional Application Ser. No. 60/225,200, entitled "Contact Detection System for Power Equipment," filed Aug. 14, 2000, by SD3, LLC.

Capacitor plates 826 can optionally be shaped to detect when the pawl is too close to the blade as well as not close enough. Alternatively, two pairs of capacitor plates may be positioned on the pawl: one pair to detect if the pawl is too close to the blade, and the other pair to detect if the pawl is too far from the blade. In any event, the detector circuitry is configured to transmit an error signal to logic controller 50, which then takes appropriate action.

While one exemplary automatic pawl spacing detection system has been described above, it will be appreciated that there are many possible variations within the scope of the invention. For example, both capacitor plates may be positioned on the same side of the blade rather than on opposite sides. The capacitor plates and/or blade detection circuitry may be separate from the pawl. In the latter case, for example, the capacitor plates and detection circuitry may be mounted on a separate electronics board associated with the pawl. Alternatively, the capacitor plates may be replaced with one or more light-emitting diodes and detectors such that, when the pawl is properly positioned, the blade obstructs the optical path between the diodes and detectors. Other methods of detecting the proximity of the blade to the pawl are also possible. As a further option, capacitor plates 826 may function as charge plates 44, 46 as well as pawl-spacing detectors. In addition, a detection plate may be mounted on beveled face 946 of the pawl. This plate can be used to detect the drive input signal used for contact detection. The amplitude of the signal detected at the plate will be inversely proportional to the space between the plate and the teeth of the blade. If this signal does not have an amplitude over a given threshold, the system would interpret this as indicating that the pawl face is not close enough to the blade.

In embodiments where portions of safety system 18 are mounted in a replaceable cartridge 80, logic controller 50 may also be configured to detect whether the cartridge is properly connected to the remainder of the safety system. One exemplary method of testing for an operable connection with the cartridge is by testing a component mounted in the cartridge (e.g., the fusible link, charge stored by firing system, etc.). Alternatively, a cable (not shown) connecting cartridge 80 to logic controller 50 may include a separate signal line which is grounded or otherwise biased when the cartridge is connected. In addition to detecting an operable connection to the cartridge, the correct blade-to-pawl spacing may be detected by measuring the blade-to-cartridge spacing. For example, capacitor plates 826 may be placed on cartridge housing 82 rather than on the pawl itself. Furthermore, failure of the blade-to-cartridge spacing test could also be used to detect an inoperable connection to the cartridge.

As described above, the present invention provides a reliable, effective and fast-acting system for preventing serious injuries to operators of power cutting machinery. While a few specific embodiments of safety system 18 and particularly control subsystem 26 have been described, those of skill in the art will appreciate that the present invention may be adapted in numerous ways for use in a wide variety of applications. Therefore, it will be understood that all such adaptations and applications are within the scope of the invention.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. No single feature, function, element or property of the disclosed embodiments is essential to all of the disclosed inventions. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

The invention claimed is:

1. A woodworking machine comprising:
   a support structure;
   a cutting tool adapted to move to cut a workpiece, where the cutting tool is supported by the support structure;
   a motor adapted to drive the cutting tool;
   a detection system adapted to detect a dangerous condition between the cutting tool and a person, where the detection system imparts an electrical signal to the cutting tool and monitors one or more characteristics associated with the electrical signal for changes indicative of the dangerous condition;
   a reaction system adapted to perform a specified action upon detection of the dangerous condition; and
   a self-test system adapted to test the operability of at least a portion of the detection system and the reaction system, and to disable the motor if the tested portion of the detection system or the reaction system is inoperable.

2. The machine of claim 1, where the detection system includes at least one charge plate operatively associated with the cutting tool, where the self-test system is configured to detect a predetermined signal on the charge plate, and where the motor is not actuated unless the predetermined signal is detected.

* * * * *